US012756555B1

(12) United States Patent
Rajendran et al.

(10) Patent No.: US 12,756,555 B1
(45) **Date of Patent: *Oct. 6, 2026**

(54) COMMUNICATION SIGNAL CONTROLLER ARCHITECTURE FOR DEPLOYING MULTIMODAL CONVERSATIONAL INTERFACES

(71) Applicant: Citibank, N.A., New York, NY (US)

(72) Inventors: Vasanthakumar Rajendran, Bridgewater, NJ (US); Joseph V. Bonanno, Jr., Scarsdale, NY (US); Karolina Belwal, Weehawken, NJ (US); Jefferson Okraku, New York, NY (US); Rachit Kumar, Fair Lawn, NJ (US); Patrick Vroman, Brooklyn, NY (US); James Randolph Myers, Clearwater Beach, FL (US); Allen Sylvester Irudayaraj, Waterloo (CA)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/636,598

(22) Filed: Apr. 1, 2026

Related U.S. Application Data

(63) Continuation of application No. 19/635,747, filed on Mar. 31, 2026.

(51) Int. Cl.
*H04L 9/08* (2006.01)
*G06F 16/23* (2019.01)
(Continued)

(52) U.S. Cl.
CPC ........ *H04L 9/0894* (2013.01); *G06F 16/2379* (2019.01); *G06N 3/0475* (2023.01); *H04L 9/50* (2022.05)

(58) Field of Classification Search
CPC ........ H04L 9/50
(Continued)

(56) References Cited

U.S. PATENT DOCUMENTS 5,892,915 A * 4/1999 Duso ........ G11B 27/10 709/219
8,799,829 B2 * 8/2014 Grosz ........ G06F 3/04845 709/219

FOREIGN PATENT DOCUMENTS

CN 116113967 A * 5/2023 ........ G06Q 50/184
WO WO-2026090244 A1 * 4/2026 ........ G06F 3/0481

* cited by examiner

*Primary Examiner* — Sibte H Bukhari
(74) *Attorney, Agent, or Firm* — Ashurst Perkins Coie US LLP

(57) ABSTRACT

Disclosed herein are systems, methods, and computer-readable media for generating and transmitting communication signals based on update signals that are detected using artificial intelligence (AI) agents. One or more AI agents can monitor a plurality of sources to detect update signals associated with available operations targeting one or more entities. In response to detecting an update signal, the AI agents can identify operations based on relevance and adherence to policy rulesets. The AI agents can generate a multimodal communication artifact that causes presentation of the operations, describes factors supporting the operations, and identifies a degree of adherence of the operations to the policy rulesets. The AI agents can automatically capture indications of the operations and adherence to the policy rulesets, allowing for provable compliance of the AI agents with the policy rulesets.

19 Claims, 12 Drawing Sheets

(51) Int. Cl.
*G06N 3/0475* (2023.01)
*H04L 9/00* (2022.01)

(58) Field of Classification Search
USPC .......................................................... 713/189
See application file for complete search history.

400

COMMUNICATION SIGNAL CONTROLLER ARCHITECTURE FOR DEPLOYING MULTIMODAL CONVERSATIONAL INTERFACES

CROSS-REFERENCE TO RELATED APPLICATION(S)

This application is a continuation-in-part of U.S. patent application Ser. No. 19/635,747 entitled "CACHING EVENT ARTIFACTS FOR COMMUNICATION SESSION TRANSMISSION VIA ONE OR MORE ENGAGEMENT CHANNELS OF A MULTIMODAL INTERFACE" and filed on Mar. 31, 2026. The content(s) of the foregoing applications are incorporated herein by reference in their entirety.

BACKGROUND

Artificial intelligence (AI) refers to the capability of computational systems to perform tasks typically associated with human intelligence, such as learning, reasoning, problem-solving, perception, and decision-making. Generative AI (sometimes called Generative AI or Gen AI) is a subfield of AI that uses generative models to produce text, images, videos, or other forms of data. These models learn the underlying patterns and structures of their training data and use them to produce new data based on the input, which often comes in the form of natural language prompts.

In recent years, there has been a significant proliferation of software tools that employ AI models, including generative AI models to interpret natural language queries provided as input by a human user and return a natural language response as output. Agentic AI is a class of AI that focuses on autonomous systems, or AI agents, that can make decisions and perform tasks with or without human intervention. The independent systems automatically respond to conditions, with procedural, algorithmic, and human-like creative steps, to produce process results.

A conversational agent refers to a type of interface that can be implemented using an AI agent and that enables users to interact with computational resources through natural language exchanges. For example, some conventional conversational agents operate through rule-based systems that match user inputs against predefined patterns and return scripted responses associated with those patterns. Other conventional conversational agents use statistical models that identify associations between inputs and responses from training data (rather than relying on manually authored rules). Further, some conventional conversational agents use neural network architectures that process input text through multiple layers of transformations to generate responses token by token, rather than selecting from predefined templates. These neural network-based agents can generate responses that were not present in training data by identifying patterns of language structure and semantic relationships during training on text corpora.

BRIEF DESCRIPTION OF THE DRAWINGS

Detailed descriptions of implementations of the present invention will be described and explained through the use of the accompanying drawings.

Figure 1:
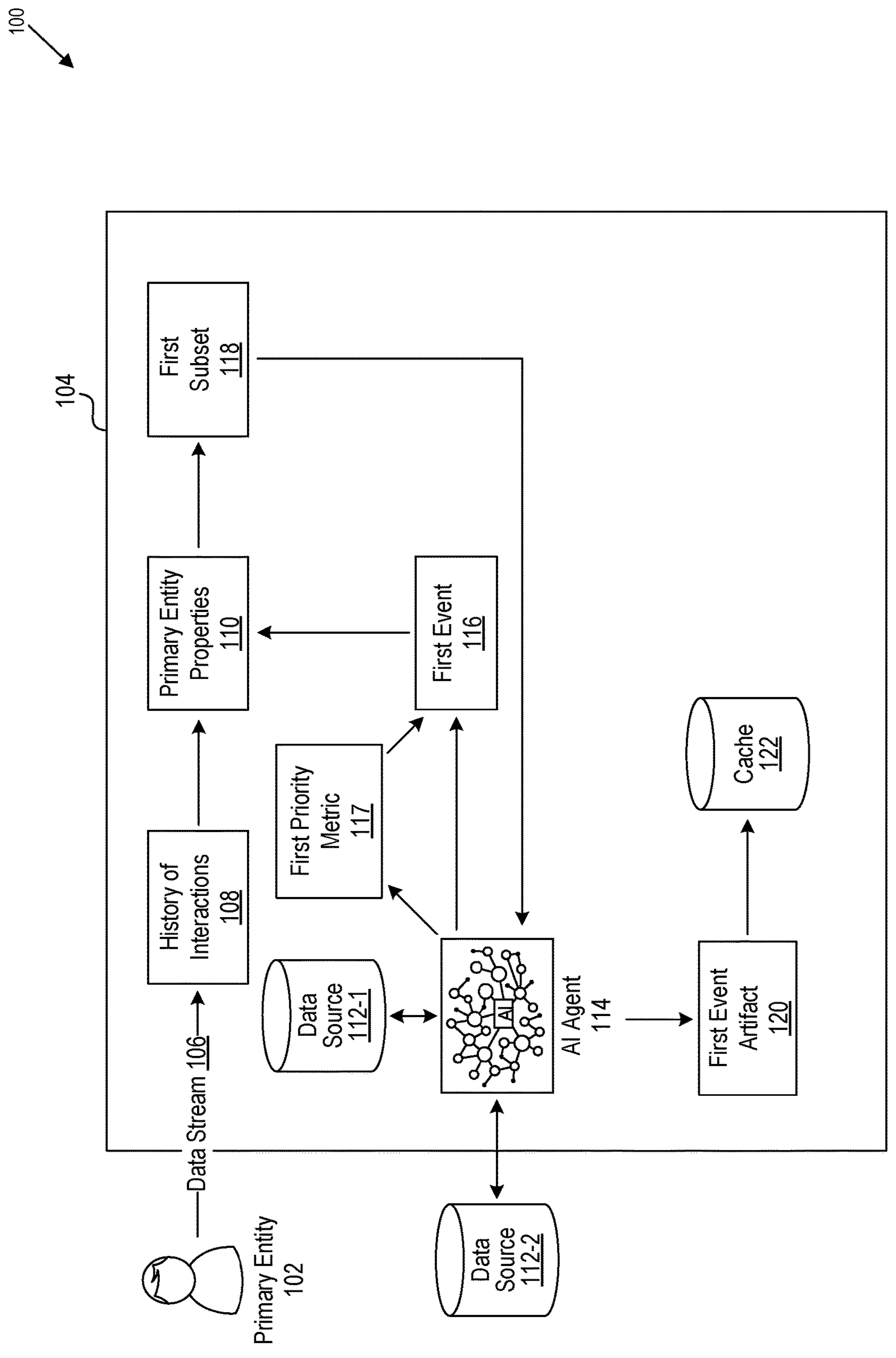
FIG. 1 is an illustration of an example event monitoring environment, in accordance with some implementations of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Many existing AI notification systems transmit notifications about events to users immediately upon event detection without consideration of whether communication can be delayed to enable more computationally efficient delivery. For example, existing systems often lack batching mechanisms which enable notifications to be grouped together into a single communication session that is established when transmission of notifications would be efficient, resulting in wasted computational overhead on repeated communication session establishment under inefficient conditions. Continuing with the same example, existing AI notification systems can fail to categorize and/or prioritize notifications associated with particular events, meaning notifications cannot be batched by category relevance and/or priority (e.g., grouping lower-priority notifications with higher-priority notifications) to save computational resources by refraining from batching and transmitting notifications unless the batch includes particularly relevant event-related notifications.

Additionally, many AI notification systems are configured to interact with and provide information to users based on a plurality of inputs but operate only in a reactive manner, responding to user queries rather than proactively identifying opportunities or events that warrant user attention. Information provided to users is also often not based on context outside of interactions between a user and the AI notification systems, meaning AI-generated responses can fail to account for interaction patterns between the user and other entities, as well as event occurrences independent of the user. Furthermore, existing multichannel notification systems can lack a coherent scheduling policy for delivering cached notifications and selecting between available transmission channels. Thus, existing AI notification systems can lack personalization, result in frequent interruptions to users, and can fail to aggregate heterogeneous data from multiple sources to comprehensively batch and prioritize notifications that can be transmitted in an efficient manner.

The present technology addresses these limitations by providing systems, methods, and computer-readable media for an event monitoring application that generates and transmits event artifacts based on events that are detected using one or more AI agents. The event monitoring application can proactively initiate a communication session with a primary entity that receives event-related information from the event monitoring application. For example, the event monitoring application can compile, from one or more data streams associated with a primary entity, a history of interactions between the primary entity and one or more other entities, and generate, based on the history of interactions, a set of primary entity properties associated with the primary entity. One or more AI agents can continuously monitor a plurality of sources to detect events. Events can be occurrences that indicate a change of value in ownership stakes (e.g., stocks or shares) of a public entity, which can be a corporation or other business entity for which ownership stakes are publicly tradeable. In response to detecting (i) occurrence of a first event and (ii) a category of the first event, the event monitoring application can select a first subset of the set of primary entity properties and assign a first priority metric to the first event based on the first subset. In response to the first priority metric satisfying a threshold for relevance of the event to the primary entity, the one or more AI agents can generate a first event artifact based on the first event and initiate the communication session by transmitting the first event artifact to the primary entity via one or more engagement channels of a multimodal interface. Additionally or alternatively, where priority metrics for events fall below the relevance threshold, the events can be cached for inclusion in future communication sessions or discarded.

The present technology provides several advantages over existing AI notification systems. By selecting a subset of the set of primary entity properties upon which to base the first priority metric, the event monitoring application enables priority metrics to be determined based only on properties that are relevant to the event given its category, which increases accuracy of relevance assessments and reduces computational resources that would otherwise be spent processing properties that have no bearing on the relevance of a particular event type. By caching certain event artifacts for future transmission, the event monitoring application can wait to send an artifact to the primary entity until the event artifact can be grouped with other artifacts, reducing the total number of communications and thereby conserving computational resources associated with establishing communication channels, transmitting data packets, and/or processing incoming messages. For example, event artifacts can be cached along with various metadata such as associated priority metrics, associated categories, times of generation, and/or an order of generation. The events can then be batched and transmitted based on this metadata to control a number of communications sessions that are initiated for event artifact transmission, conserving computational and network resources that would otherwise be spent on excessive communication session initiation. Some event artifacts can also be discarded before being transmitted (e.g., due to being low-priority and/or stale based on age/generation order), conserving computational resources that would otherwise be spent on batching and transmitting each generated event artifact by consolidating the number of artifacts without discarding data that remains relevant to the primary entity.

Furthermore, by aggregating heterogeneous data from multiple sources including Internet news sources, public entity value sources, and/or entity ownership sources and by compiling the history of interactions between the primary entity and other entities, the technology enables more comprehensive analysis and more accurate prioritization of events tailored to the primary entity in comparison to single-source alert systems and/or other alert systems that do not ingest such heterogeneous data. Additionally, the multimodal interface with multiple engagement channels can enable personalized communication with primary entities through preferred and/or computationally efficient modalities of the multimodal interface, thereby proactively providing customized information more efficiently than existing solutions. For example, one or more engagement channels of the multimodal interface can be selected for transmission based on communications preferences of the primary entity, a data type of the event artifacts being transmitted, and/or an absence of communication-related technical constraints, helping to direct transmissions to engagement channels that are unlikely to cause delays/errors in transmission and/or which are likely to be viewed by the primary entity.

One context in which the present technology can provide technological improvements over existing AI notification systems is in the financial services context, where many robo-advisor systems perform automated financial operations such as portfolio rebalancing, risk-based asset allocation, and tax-loss harvesting, but are typically user-initiated, stateless, and rule-based. Thus, these systems do not autonomously/proactively notify users when relevant financial events occur or customize notifications to individual users, both features that can be performed by the present technology. Similarly, event-driven trading systems can execute algorithmic trades based on market signals, but these systems typically lack a conversational layer, do not incorporate client-specific reasoning into their operations, and do not aggregate a plurality of data sources to proactively predict financial events of interest. By contrast, the present technology can include personalized communication that is initiated by the event monitoring application itself, and which performs artifact distribution in a computationally efficient manner enabled by caching and priority metric tracking.

Further, conventional AI agent frameworks lack automated mechanisms for generating, recording, and providing transparent explanations for event artifacts-including the data sources used to detect events, reasoning frameworks used to determine relevance of events, factors contributing to the generation of event artifacts, and confidence levels of predicted outcomes associated with the events. For example, when an AI agent detects an event and generates an event artifact describing available interactions, the AI agent can fail to identify or record the data sources, reasoning processes, and contextual factors that led to the generation of the event artifact. Moreover, AI agent systems in regulated or safety-critical environments must satisfy operational constraints, including policy requirements and legal duties. Therefore, such AI agent systems can be required to provide provenance records indicating adherence to constraints, factors influencing risk metrics associated with interactions, proof that required disclosures were presented in event artifacts, and records indicating that sensitive data was handled with secure functions. In addition, policy and constraint gating applied to event artifact generation must be auditable and reproducible across model versions. As AI agent systems are updated, retrained, and/or replaced with newer model versions, the policy evaluations and constraint checks applied to event artifact generation can change in ways that are difficult to detect or verify without a persistent record of the inputs, rules, and reasoning used at the time of each decision. Furthermore, such explanations and assurances can be required of multimodal interaction data, including text, audio, and/or video interaction data with primary entities.

The present technology addresses these technical limitations by implementing a communication session signal controller that coordinates multi-agent execution with deterministic audit records. The communication session signal controller can receive update signals pertaining to events and, in response, use one or more AI agents to generate candidate executable operations associated with the events. The communication session signal controller can evaluate the candidate executable operations against a versioned policy ruleset while simultaneously recording metadata about the operations, the policy ruleset, and the interactions between them-including which policy rules were applied, the constraint evaluation outputs for each candidate operation, and the policy-alignment outputs characterizing degrees of alignment between the candidate operations and the policy ruleset and/or primary entity properties. Based on the policy-alignment outputs, the communication session signal controller can identify selected operations and route the selected operations through an execution protocol state machine that determines an execution pathway (e.g., automatic execution, presentation to the primary entity for confirmation, presentation to an assisting entity for approval, and/or abort/hold due to a policy violation) based on triggers such as execution risk metrics, confidence thresholds, policy alignment conditions, and/or historical response patterns. The communication session signal controller can generate multimodal communication artifacts that include explanations derived from the data captured during the evaluation-such as the basis for operation selection, the policy rules applied, the data sources used, and the degrees of alignment between the selected operations and the primary entity properties and/or the policy ruleset. The communication session signal controller can produce trace log entries that conform to a deterministic audit trail data schema and store the trace log entries in tamper-evident append-only logs using cryptographic commitments (e.g., hash pointers, Merkle tree roots) that link entries and enable verification of data integrity.

The data captured during the evaluation of candidate operations can be collected by a provenance module included in the communication session signal controller. The provenance module can record metadata associated with data sources, AI agent inferences, policy evaluations, and artifact generation steps across the processing pipeline. By associating each detected event with its corresponding data sources and processing steps, the provenance module addresses the lack of transparent explanations in conventional AI agent frameworks by establishing a traceable record of the information flow from data ingestion through operation selection and artifact generation. This data lineage can be used to verify the accuracy of detected events and to reproduce the reasoning that led to a particular operation selection.

The communication session signal controller can include an explainability engine that receives data captured by the provenance module and generates human-readable explanations based on the captured data. The explainability engine can process policy-alignment outputs, execution risk metrics, and contextual factors to generate natural language explanations describing the basis for operation selection and the policy rules applied. The explainability engine can generate explanations in multimodal formats, including text, audio data, and/or video data. By generating explanations that reference specific data sources, rule evaluations, and reasoning steps rather than opaque AI outputs, the explainability engine addresses the requirement for transparent explanations of multimodal interaction data in regulated or safety-critical environments.

The communication session signal controller can include a commitment module that generates trace log entries conforming to a deterministic audit trail data schema. The audit trail data schema can define required fields and data types such that trace log entries are consistently produced for each operation processed by the communication session signal controller, independent of the probabilistic nature of outputs generated by the AI agents. By producing trace log entries with a consistent structure, the commitment module addresses the requirement for auditable and reproducible policy evaluations across model versions, because verification systems can reliably retrieve and validate trace log entries for any operation regardless of when the operation was processed or which model version was used.

The commitment module can store the trace log entries in tamper-evident storage structures, such as an append-only log that can include a blockchain, a Merkle log, write-once-read-many (WORM) storage, and/or another tamper-evident data structure. The commitment module can generate cryptographic commitments over the trace log entries, including hash pointers that link each entry to a previous entry to form a hash chain, and Merkle tree roots that enable verification of data integrity across multiple entries. Sensitive payloads can be stored in encrypted form in a secure database while hash commitments over the sensitive payloads are stored in the append-only log. By combining deterministic audit records with cryptographic commitments and tamper-evident storage, the commitment module enables the communication session signal controller to demonstrate compliance with policy rulesets, satisfy regulatory and legal constraints, and provide verifiable provenance records that support trustability of the AI agent operations.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Example Event Artifact Environments

FIG. 1 is an illustration of an example event monitoring environment 100, in accordance with some implementations of the present technology. The event monitoring environment 100 includes a primary entity 102, an event monitoring application 104, a data stream 106, a history of interactions 108, a set of primary entity properties 110, a first data source 112-1, a second data source 112-2, an AI agent 114, a first event 116, a first priority metric 117, a first subset 118, a first event artifact 120, and a cache 122. The event monitoring environment 100 can be implemented using components of the example computer system illustrated and described in more detail with reference to FIG. 10. Likewise, implementations of the example event monitoring environment 100 can include different and/or additional components or can be connected in different ways.

The primary entity 102 is an individual, an organization, a software application, an AI agent, or any other actor/computer-implemented process having access to an event monitoring application 104. The primary entity 102 is also an actor/computer-implemented process for which the event monitoring application 104 collects associated information that is used to proactively generate artifacts that can be informative, useful, and/or otherwise relevant to the primary entity 102 and initiates communication sessions in which those artifacts are provided to the primary entity 102. In some implementations, the primary entity 102 performs one or more interactions with one or more other entities. For example, these other entities can be corporations or other business entities for which ownership stakes (e.g., publicly traded stocks or other shares) can be transacted and the interactions can be transactions, inquiries, and/or other actions associated with those ownership stakes. In such implementations, the event monitoring application 104 can compile, from a data stream 106 associated with the primary entity 102, a history of interactions 108. The history of interactions 108 can be a list, description, and/or other record of past interactions between the primary entity 102 and one or more of the other entities, and can thereby provide documentation of ownership stakes in particular entities that have been acquired by, have been sold by, are of interest to, or are otherwise associated with the primary entity 102. Additionally or alternatively, the history of interactions 108 can include previous interactions between the primary entity 102 and the event monitoring application 104 and/or other applications that can provide financial services to the primary entity 102. For example, previous interactions between the primary entity 102 and financial services applications can include bank account transactions, financial planning documentation (e.g., concerning retirement, large purchases, and/or other financial events), account setting specifications (e.g., concerning privacy/security of particular financial accounts, spending/credit limits, account beneficiaries, owners, or trustees, and/or the like), and/or other financial services interactions.

In some implementations, the data stream 106 includes one or more of a transaction data stream, a portfolio position data stream, a market signal data stream, an account activity data stream, and/or a client communication data stream. Each data stream type can provide distinct categories of information that contribute to the compilation of the history of interactions 108. In some implementations, the event monitoring application 104 receives one or more data streams including the data stream 106 via one or more secure data transmission protocols such as Transport Layer Security (TLS) encrypted connections, Secure File Transfer Protocol (SFTP) batch transfers, or message queue systems implementing encryption at rest and in transit. The one or more data streams can be authenticated using API keys, OAuth tokens, or certificate-based authentication to verify the identity of data sources and maintain data integrity.

In some implementations, the data stream 106 includes a transaction data stream comprising records of completed and pending financial transactions associated with the primary entity 102. The transaction data stream can include buy orders, sell orders, dividend reinvestment transactions, fund transfers, wire transfers, automated clearing house (ACH) transactions, and/or check deposits. Each transaction record in the transaction data stream can include a timestamp indicating when the transaction was initiated and/or completed, a transaction amount, an asset identifier (e.g., a ticker symbol, Committee on Uniform Security Identification Procedures (CUSIP) number, or international security identification number (ISIN)), a transaction type indicator, and/or account identifiers indicating source and destination accounts. The transaction data stream can be received from one or more brokerage systems, banking platforms, and/or custodial systems via application programming interfaces (APIs) that transmit transaction records in real-time or near-real-time as transactions are processed.

In some implementations, the data stream 106 includes a portfolio position data stream comprising current and historical holdings information associated with the primary entity 102 (e.g., information associated with entity ownership stakes held by the primary entity 102). The portfolio position data stream can include equity positions, fixed income positions, mutual fund holdings, exchange-traded fund (ETF) holdings, options contracts, and/or cash balances across one or more accounts. Each position record in the portfolio position data stream can include an asset identifier, a quantity or share count, a cost basis, a current market value, an unrealized gain or loss calculation, and/or a lot-level breakdown indicating acquisition dates and prices for tax lot tracking purposes. The portfolio position data stream can be received from one or more brokerage systems, banking platforms, custodial systems, and/or securities exchanges and can be updated at predetermined intervals (such as end-of-day or intraday) or in response to transaction events that modify position quantities.

In some implementations, the data stream 106 includes a market signal data stream comprising real-time and historical market data relevant to assets held by or of interest to the primary entity 102. The market signal data stream can include price quotes, bid-ask spreads, trading volume data, corporate action announcements, earnings reports, credit rating changes, bond maturity notifications, dividend declarations, and/or stock split announcements. The market signal data stream can be received from one or more market data providers, securities exchanges, rating agencies, and/or financial news aggregators. Each market signal record can include a timestamp, an asset identifier, a signal type indicator, and signal-specific data fields such as price values, rating designations, and/or corporate action parameters.

In some implementations, the data stream 106 includes an account activity data stream comprising records of non-transactional account events associated with the primary entity 102. The account activity data stream can include login events, session duration data, page view sequences, feature utilization metrics, document access records, and/or communication preference updates associated with the event monitoring application 104 and/or other applications that can provide financial services to the primary entity 102.

Accordingly, the account activity data stream can be received from the application including the account for which the account events in question occur.

In some implementations, the data stream 106 includes a client communication data stream comprising records of prior communications between the primary entity 102 and one or more advisory entities (e.g., human or automated financial advisors), customer service representatives, and/or automated systems (e.g., AI agents). The client communication data stream can include transcripts of voice conversations, chat message logs, email correspondence, and/or records of responses to prior event artifacts. Each communication record can include a timestamp, a communication channel identifier, participant identifiers, and/or content data such as text transcripts or audio recordings. The client communication data stream can be processed by the event monitoring application 104 (e.g., using natural language processing techniques/one or more AI models) to extract stated preferences, questions, concerns, and feedback associated with the primary entity 102.

In some implementations, the data stream 106 includes a financial plan data stream comprising structured data representing financial planning information associated with the primary entity 102. The financial plan data stream can include stated investment objectives, target asset allocations, retirement planning parameters, education funding goals, estate planning considerations, and/or tax optimization preferences. The financial plan data stream can be received from financial planning software systems and/or can be compiled from structured questionnaires completed by the primary entity 102 (e.g., after being presented to the primary entity 102 by the event monitoring application 104). Each financial plan record can include goal identifiers, target amounts, target dates, priority rankings, and/or constraint parameters that define boundaries for recommended interactions.

In some implementations, the event monitoring application 104 generates, based on the history of interactions 108, a set of primary entity properties 110 associated with the primary entity 102. Each property in the set of primary entity properties 110 can be a particular property describing a behavior of the primary entity 102 in relation to particular events and can be associated with one or more categories of events to indicate the type(s) of event for which the property is relevant to the related behavior of the primary entity 102. An event can be any change in circumstances of a public entity (e.g., a business entity having publicly traded stocks/shares) that can indicate a change of value in ownership stakes of that public entity, such as a market volatility event (e.g., an increase in a stock price indicator corresponding to volatility), a cash availability event (e.g., a discrete increase/decrease in liquid cash available to the public entity), a credit rating change, a corporate action announcement, an earnings report, a bond maturity event, a dividend declaration, a stock split announcement, a corporate lifecycle event (e.g., an initial public offering (IPO), an acquisition), and/or another event impacting a valuation of the public entity. Accordingly, the event monitoring application 104 can aid the primary entity 102 by proactively notifying the primary entity 102 of an event for which the set of primary entity properties 110 indicates the primary entity 102 has an interest in interacting with the public entity (e.g., acquiring, selling, and/or rebalancing an ownership stake in the public entity), given the change in value in ownership stakes of the public entity that is associated with the event.

In some implementations, the set of primary entity properties 110 includes a risk tolerance associated with the primary entity 102 that describes a level of risk associated with financial transactions that the primary entity 102 is willing to adopt. The risk tolerance can be determined based on data from the transaction data stream indicating historical trading patterns (e.g., frequency of trades in volatile assets, use of options or leveraged instruments), data from the portfolio position data stream indicating asset allocation across risk categories (e.g., proportion of holdings in equities versus fixed income), and/or data from the financial plan data stream indicating stated risk preferences from questionnaires or planning documents. The risk tolerance property can be associated with categories of events including market volatility events, credit rating changes, and/or corporate action announcements, as such events can affect the risk profile of holdings.

In some implementations, the set of primary entity properties 110 includes a time horizon associated with the primary entity 102 that describes a duration of time into the future for which the primary entity 102 is targeting capitalizing on acquired ownership stakes and/or performing a milestone financial event (e.g., retiring, purchasing a home). The time horizon can be determined based on data from the financial plan data stream indicating target dates for financial goals (e.g., retirement dates, education funding timelines), data from the portfolio position data stream indicating the maturity dates of particular holdings (e.g., fixed income holdings), and/or data from the client communication data stream indicating stated investment timeframes. The time horizon property can be associated with categories of events including bond maturity events, dividend reinvestment opportunities, and lifecycle events, as such events are dependent on particular time horizons.

In some implementations, the set of primary entity properties 110 includes an entity preference associated with the primary entity 102 that describes a set of entities and/or types of entities for which the primary entity 102 is willing to transact ownership stakes. The entity preference can be determined based on data from the transaction data stream indicating historical patterns of investment in particular sectors, industries, and/or individual entities, data from the portfolio position data stream indicating current concentration in particular holdings, and/or data from the client communication data stream indicating expressed interest in, or aversion to, particular entities. The entity preference property can be associated with categories of events including earnings reports, corporate action announcements, and/or news events associated with entities in which the primary entity 102 has demonstrated interest.

In some implementations, the set of primary entity properties 110 includes an entity interaction composition associated with the primary entity 102 describing a composition of currently held ownership stakes acquired by the primary entity 102 via previous interactions. The entity interaction composition can be determined based on data from the portfolio position data stream indicating a distribution of holdings across asset classes, sectors, and geographic regions, and/or data from the transaction data stream indicating patterns of diversification or concentration over time. The entity interaction composition property can be associated with categories of events including market signal events affecting particular asset classes, sector rotation opportunities, and/or rebalancing events triggered by drift from target allocations.

In some implementations, the set of primary entity properties 110 includes a liquidity profile associated with the primary entity 102 that indicates an amount of liquid and/or illiquid assets currently available to the primary entity 102. The liquidity profile can be determined based on data from the portfolio position data stream indicating cash balances and/or holdings in liquid versus illiquid assets, data from the transaction data stream indicating patterns of cash inflows, cash outflows, and/or upcoming events for which liquidity is required (e.g., purchases, tax obligations), and/or data from the account activity data stream indicating frequency of withdrawals and/or transfers. The liquidity profile property can be associated with categories of events including cash availability events, bond maturity events that generate cash proceeds, and/or investment opportunities requiring available capital.

In some implementations, the set of primary entity properties 110 includes an engagement signal received from the primary entity 102 that indicates a level of engagement, by the primary entity 102, with particular content included in the event monitoring application 104 and/or another financial services application. The engagement signal can be determined based on data from the account activity data stream indicating login frequency, session duration, and/or feature utilization patterns, data from the client communication data stream indicating responsiveness to prior communications and event artifacts, and/or data indicating preferred communication channels and times. The engagement signal property can be relevant to determining the degree of interest of the primary entity 102 in any particular category of event, as increased engagement by the primary entity 102 with content related to that category can be predictive of the primary entity 102 also being particularly interested in future events in the category.

In some implementations, the set of primary entity properties 110 includes an account permission associated with the primary entity 102 that describes a permission for accessing, transacting, and/or distributing one or more assets held in a particular account of the primary entity 102. The account permission can be determined based on data from account configuration records indicating account ownership, trustee/beneficiary designations, credit/margin limits, authorization levels for different types of transactions (e.g., discretionary versus non-discretionary accounts), data indicating regulatory constraints or account restrictions, and/or data from the client communication data stream indicating delegated authority to access the account (e.g., for advisory entities). The account permission property can be associated with categories of events for which particular permissions are required to perform one or more interactions associated with those events.

The event monitoring environment 100 can include a plurality of data sources. For example, as depicted in FIG. 1, a first data source 112-1 is included in the event monitoring application 104 and a second data source 112-2 is external to the event monitoring application 104. However, the present technology is not so limited; additional data sources can be included and the first data source 112-1 and/or second data source 112-2 can be included in different applications/locations than depicted. The first data source 112-1 can be a public entity value source that tracks/records the value of shares of one or more public entities and/or can be an entity ownership source that tracks/records ownership, by the primary entity 102, of one or more public entities. The second data source 112-2 can be a public entity value source, an entity ownership source, and/or an Internet news source, which generates, compiles, and/or otherwise makes available news stories associated with public entities that include information about events associated with those public entities.

In some implementations, the event monitoring application 104 includes an AI agent 114. The AI agent 114 is a combination of hardware and/or software that executes an AI model or algorithm, applies the model to a dataset, and processes the output of the model to automatically perform one or more functions. For example, the AI agent 114 can invoke a neural network, decision tree, or other machine learning (ML) algorithm trained to interpret natural language describing information about a public entity, apply this algorithm to the natural language and/or context data available to the AI agent 114, and then use the output of the algorithm to determine occurrence of an event. Additionally or alternatively, the AI agent 114 can include one or more components of the example transformer 1012 described in relation to FIG. 10 below and/or the AI system 1100 described in relation to FIG. 11 below. In some implementations, the AI agent 114 and/or one or more other AI agents monitor (e.g., continuously or at predetermined time intervals) the first data source 112-1 and/or the second data source 112-2 to detect events associated with available interactions with one or more public entities (e.g., available transactions of ownership stakes in the public entities). For example, one or more AI agents (e.g., including the AI agent 114) can receive, as input, natural language and/or numerical data from the first data source 112-1 and/or the second data source 112-2 and analyze this input data to determine that a change in available interactions associated with one or more public entities is reflected by, or likely to occur based on, the input data. Based on this analysis, the one or more AI agents can then generate an output indicating an actual and/or a predicted occurrence of an event.

Using one or more AI agents to automatically monitor data sources and detect events provides a technical improvement over existing systems that generate alerts to indicate occurrence of events, as these systems can fail to aggregate heterogeneous data from multiple sources and comprehensively analyze the aggregated data to accurately detect event occurrences. Furthermore, existing alert systems can fail to reason based on input data to predict future events even where events that have occurred are detected. By contrast, the one or more AI agents can be trained based on historical data to make predictions based on newly received input, enabling the one or more AI agents to signal to the event monitoring application 104 that an event is likely to occur before the occurrence itself.

As depicted in FIG. 1, the event monitoring application detects, based on monitoring of the first data source 112-1 and the second data source 112-2 by the AI agent 114, occurrence of a first event 116. In some implementations, the AI agent 114 determines a category of the first event via the monitoring. For example, the AI agent 114 can determine, based on a semantic meaning of particular data, by matching characteristics of the first event 116 against predefined event category definitions, by applying a classification model trained to categorize events based on input features, and/or based on a source from which the particular data was obtained, that the event is of a particular type and therefore belongs to a particular category associated with that type of event.

In response to detecting the occurrence of the first event 116, the event monitoring application 104 can select a first subset 118 of the set of primary entity properties 110. Each property in the first subset 118 can be associated with the detected category of the first event 116. For example, where the AI agent 114 determines that the first event 116 is a market volatility event, the first subset 118 can include the risk tolerance property and the entity interaction composition property, as these properties are relevant to evaluating how the primary entity 102 would respond to volatility-related interactions. As another example, where the AI agent 114 determines that the first event 116 is a bond maturity event, the first subset 118 can include the time horizon property and the liquidity profile property, as these properties are relevant to evaluating how the primary entity 102 would respond to fixed income maturity events. The first subset 118 can be selected by the AI agent 114 based on a mapping between event categories and associated properties stored in a configuration database, and/or the AI agent 114 can dynamically determine which properties are relevant to a particular event category based on semantic analysis of the event data and property definitions.

In some implementations, the AI agent 114 assigns a first priority metric 117 to the first event 116 based on the first subset 118 of the set of primary entity properties 110.

The first priority metric 117 quantifies a predicted relevance of the first event 116 to the primary entity 102 and/or urgency with which the primary entity 102 should be informed about the first event 116. The first priority metric 117 can be calculated by the AI agent 114 using one or more AI models that process the first subset 118 as input. For example, the AI agent 114 can apply a scoring function that weights each property in the first subset 118 according to its relevance to the category of the first event 116 and aggregates the weighted values to produce the first priority metric. The first priority metric can be a numerical value within a predetermined scale (e.g., a value between 0 and 100) that indicates a degree to which the first event 116 is likely to be of interest to the primary entity 102.

Selecting the first subset 118 of the set of primary entity properties 110 provides a technical improvement over existing event notification systems that evaluate events against all available user properties regardless of event type. By basing the first priority metric on the first subset 118 rather than the entire set of primary entity properties 110, the AI agent 114 can generate a more accurate priority assessment in comparison to other solutions that use a wider set of properties, as the first subset 118 reflects only those characteristics of the primary entity 102 that are relevant to the particular category of the first event 116. Furthermore, by filtering the set of primary entity properties 110 to include only properties associated with the category of the first event 116, the event monitoring application 104 reduces the computational resources required to calculate the first priority metric, as fewer properties are processed by the AI agent 114. Existing systems that process all user properties for every detected event can consume significant processing cycles and memory bandwidth evaluating properties that have no bearing on the relevance of a particular event type. By contrast, the present technology enables the AI agent 114 to focus computational resources on processing only the properties in the first subset 118, thereby reducing processing time and improving the throughput of the event monitoring application 104 when monitoring multiple events.

In some implementations, in response to the first priority metric falling within a first predetermined metric range, the AI agent 114 can generate a first event artifact 120 based on the first event 116 and the set of primary entity properties 110. The first event artifact 120 can include a natural language message describing a first interaction with a first public entity that is currently available to the primary entity 102. For example, where the first event 116 is a dividend declaration event associated with a public entity in which the primary entity 102 holds an ownership stake, the first event artifact 120 can include a natural language message informing the primary entity 102 of the dividend declaration and describing available interactions such as reinvesting the dividend (e.g., to acquire more shares of the public entity) or receiving a cash distribution. The AI agent 114 can generate the first event artifact 120 using a language model that receives the first event 116 and the set of primary entity properties 110 as input and produces a personalized natural language message as output. The first event artifact 120 can be customized based on the set of primary entity properties 110 to reflect the communication preferences, financial sophistication, specific circumstances, and/or other individualized characteristics of the primary entity 102. As another example, the first event artifact 120 can be a data structure including a plurality of fields for describing the first event 116 that can be populated by the AI agent 114 and/or a set of deterministic rules. Using the data structure for the first event artifact 120 conserves computational resources of the event monitoring application 104, as the AI agent 114 can be replaced with deterministic rules (which are less computationally-intensive to execute than the probabilistic actions of the AI agent 114) for populating particular fields of the first event artifact 120, or the AI agent 114 can be constrained to retrieving and processing data that conforms to the predefined plurality of fields, reducing a space of potential actions traversed by the AI agent 114. For example, the plurality of fields can include an identifier of the first event 116, a category of the first event 116, a generation and/or expiration timestamp for the first event artifact 120, the first priority metric 117, a natural language summary of the first event 116, and/or other informational fields.

The first predetermined metric range indicates a range of metric values for which associated events are relevant enough to the primary entity 102 that generating a related artifact to present to the primary entity 102 is worthwhile, but that are not relevant/urgent enough to warrant the primary entity 102 receiving related information before other, more relevant/urgent information is also available. Accordingly, in some implementations, the event monitoring application 104 caches the first event artifact 120 in a cache 122 for future transmission during a communication session between the AI agent 114 and the primary entity 102. The cache 122 can be implemented as any suitable data store including a combination of hardware and/or software, including local memory (e.g., random-access memory allocated to the event monitoring application 104), remote memory (e.g., a distributed cache accessible via a network connection), short-term memory (e.g., a volatile storage medium that retains data for a limited duration), or long-term memory (e.g., a persistent storage medium such as a solid-state drive or database system). The cache 122 can store the first event artifact 120 along with associated metadata including the first priority metric 117, a timestamp indicating when the first event artifact 120 was generated, an expiration time after which the first event artifact 120 is no longer valid, and identifiers linking the first event artifact 120 to the first event 116 and the primary entity 102. The cache 122 can be organized as a priority queue that orders cached event artifacts according to their respective priority metrics, enabling the event monitoring application 104 to retrieve and transmit higher-priority artifacts before lower-priority artifacts.

Caching the first event artifact 120 provides a technical improvement over existing event notification systems that transmit notifications immediately upon event detection. By storing the first event artifact 120 in the cache 122 rather than immediately transmitting it to the primary entity 102, the event monitoring application 104 can wait until additional event artifacts are generated and then group/batch multiple artifacts together for transmission in a single communication session. This approach reduces the total number of communications between the event monitoring application 104 and the primary entity 102, thereby conserving computational resources associated with establishing communication channels, transmitting data packets, and processing incoming messages at the primary entity 102. Additionally, caching enables the event monitoring application 104 to defer transmission of a lower-priority artifact until a higher-priority artifact is available, ensuring that communications with the primary entity 102 are initiated based on events of greater relevance rather than simply based on the chronological order in which events were detected. Furthermore, by maintaining the expiration time and timestamp for event artifacts stored in the cache 122, the cache 122 enables the event monitoring application 104 to discard artifacts that have not been transmitted to the primary entity 102 within a predetermined period of time, improving computational efficiency by clearing memory space that would otherwise be unavailable for storing other artifacts of greater relevance to the primary entity 102.

Figure 2:
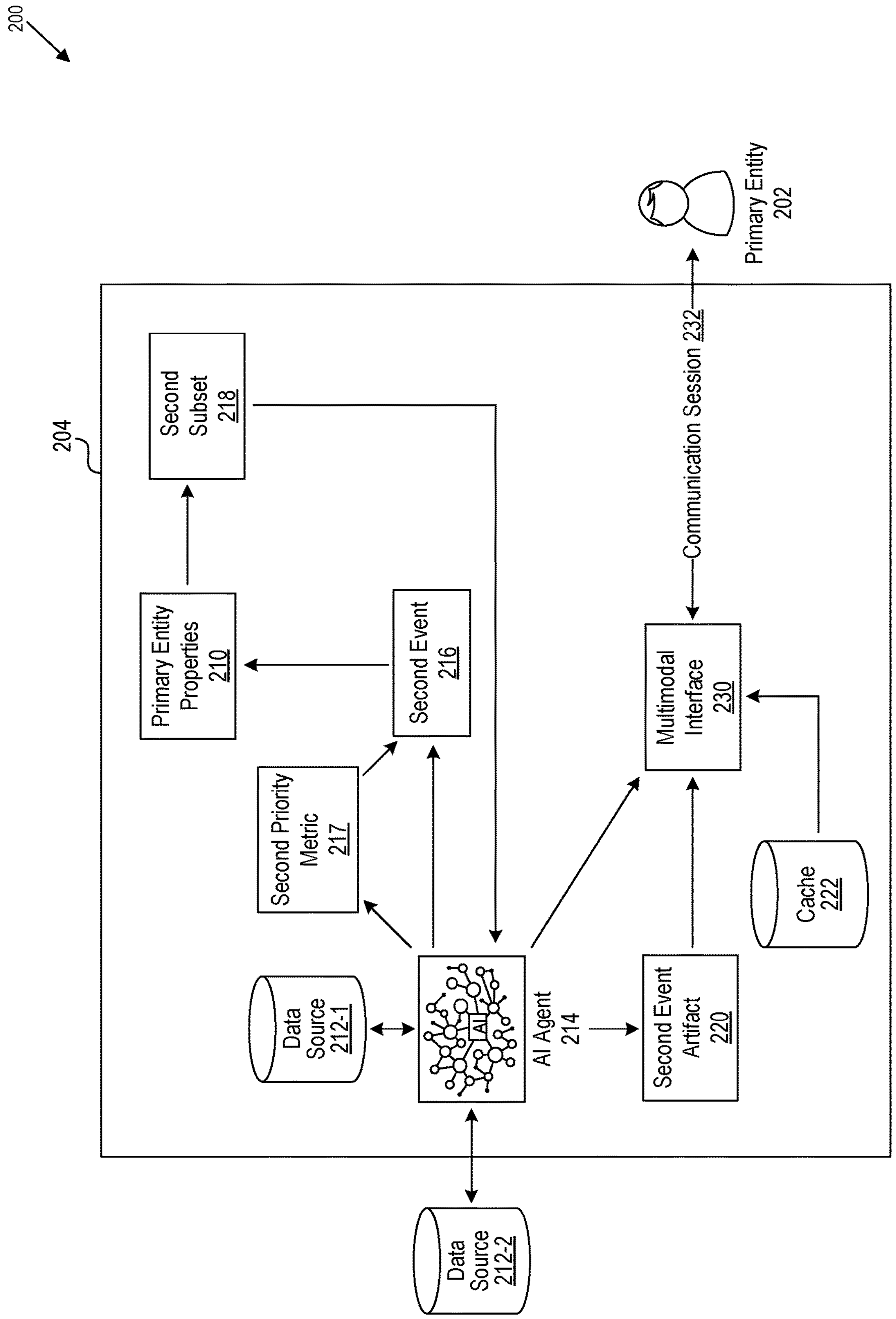
FIG. 2 is an illustration of a second example of an event monitoring environment, in accordance with some implementations of the present technology.

FIG. 2 is an illustration of a second example of an event monitoring environment 200, in accordance with some implementations of the present technology. The event monitoring environment 200 includes a primary entity 202, an event monitoring application 204, a set of primary entity properties 210, a first data source 212-1, a second data source 212-2, an AI agent 214, a second event 216, a second subset 218, a second event artifact 220, a cache 222, a multimodal interface 230, and a communication session 232. The primary entity 202, the event monitoring application 204, the set of primary entity properties 210, the first data source 212-1, the second data source 212-2, the AI agent 214, and the cache 222 can be the same as or generally similar to, respectively, the primary entity 102, the event monitoring application 104, the set of primary entity properties 110, the first data source 112-1, the second data source 112-2, the AI agent 114, and the cache 122 as described in relation to FIG. 1 above. The event monitoring environment 200 can be implemented using components of the example computer system illustrated and described in more detail with reference to FIG. 10. Likewise, implementations of the example event monitoring environment 200 can include different and/or additional components or can be connected in different ways.

In some implementations, the AI agent 214 detects, via monitoring (e.g., either continuously or at a predetermined interval) of the first data source 212-1 and the second data source 212-2, (i) occurrence of a second event 216 and (ii) a category of the second event 216. The second event 216 can be an event that is distinct from/different to the first event 116 described in relation to FIG. 1 and can be associated with a different public entity and/or the same public entity as the first event 116. The AI agent 214 can determine the occurrence of, and the category of, the second event 216 in a generally similar manner to the determinations of the occurrence and category of the first event 116 as described in relation to FIG. 1 above, except that the determinations related to the second event 216 are made using different data.

In response to detecting the occurrence of the second event 216, the event monitoring application 204 selects a second subset 218 of the set of primary entity properties 210. Each property in the second subset 218 can be associated with the category of the second event 216. Thus, the second subset 218 can include different properties than the first subset 118 described in relation to FIG. 1 where the category of the second event 216 differs from the category of the first event 116. The AI agent 214 can select the second subset 218 in a same or generally similar manner to selecting the first subset 118, as described in relation to FIG. 1 above.

In some implementations, the AI agent 214 assigns a second priority metric 217 to the second event 216 based on the second subset 218 of the set of primary entity properties 210. The second priority metric 217 quantifies a predicted relevance of the second event 216 to the primary entity 202 and/or an urgency with which the primary entity 202 should be informed about the second event 216. The AI agent 214 can calculate the second priority metric 217 using one or more AI models that receive the second subset 218 as input and produce a numerical priority value as output. The second priority metric 217 can be calculated in a same or generally similar manner to calculating the first priority metric 117 described in relation to FIG. 1, enabling direct comparison between priority metrics assigned to different events. For example, the AI agent 214 can apply weighted scoring functions to each property in the second subset 218 and aggregate the weighted values to produce the second priority metric 217.

In response to the second priority metric falling within a second predetermined metric range, the AI agent 214 can generate a second event artifact 220 based on the second event 216 and the set of primary entity properties 210. In contrast to the first predetermined metric range, the second predetermined metric range indicates a range of metric values for which associated events are relevant enough to the primary entity 202 to warrant the primary entity 202 receiving information about the event without intentional delay/caching of that information. The second event artifact 220 can include a natural language message describing a second interaction with a second public entity that is currently available to the primary entity 202. For example, where the second event 216 is a credit rating downgrade event associated with a public entity in which the primary entity 202 holds an ownership stake, the second event artifact 220 can include a natural language message informing the primary entity 202 of the rating change and describing available interactions such as selling the ownership stake, maintaining the current position, or acquiring additional shares at a potentially reduced price. The AI agent 214 can generate the second event artifact 220 using a language model that receives the second event 216 and the set of primary entity properties 210 as input and produces a personalized natural language message as output. The second event artifact 220 can be customized in a same or generally similar manner to the first event artifact 120 described in relation to FIG. 1 above.

In some implementations, the AI agent 214 selects one or more engagement channels of a multimodal interface 230 accessible by the primary entity 202. The multimodal interface 230 is a communication interface that supports multiple modalities for transmitting information to and receiving information from the primary entity 202. The one or more engagement channels can include a text-based channel (e.g., a chat interface, an email interface, a short message service (SMS) interface), a voice-based channel (e.g., a telephone call interface, a voice assistant interface), and/or a visual channel (e.g., a video interface, an animated avatar interface). The AI agent 214 can select the one or more engagement channels based on engagement signals included in the set of primary entity properties 210 that indicate preferred communication modalities of the primary entity 202, based on the category and urgency of the events being communicated, and/or based on availability of the primary entity 202 on particular channels. Additionally or alternatively, the one or more engagement channels can be selected, by the AI agent 214 and/or a set of deterministic algorithms, based on a data type of the first event artifact and/or the second event artifact 220 (e.g., text artifacts are sent via a text-based channel, video artifacts are sent via a visual channel) and/or absence of a channel constraint indicating a likelihood of successful transmission, via the one or more engagement channels of the first event artifact and/or the second event artifact 220. For example, the channel constraint can be a low available bandwidth, an incompatibility with a computing device of the primary entity 202 that receives artifacts and/or another condition indicating a low likelihood that artifacts can be sent without interruption, failure, or another error. Thus, selecting the one or more engagement channels on account of lacking such a channel constraint enables artifacts to be cached until successful transmission via the one or more engagement channels is likely, conserving computational resources that would otherwise be spent on attempted transmission of artifacts that ultimately result in errors.

The multimodal interface can include an avatar within one or more of the supported communication modalities. Avatars refer to a type of interface that evolved from conversational agents by incorporating a representational identity that persists across interactions and presents information through one or more output modalities. An avatar can manifest as a text-based persona, a voice-based persona, and/or a visual persona. In some implementations, the avatar combines multiple modalities by presenting as a two-dimensional or three-dimensional animated figure that exhibits body gestures that correspond to the content being communicated. In some implementations, the avatar presents as a static visual representation or no visual representation. The avatar can operate as a point of interaction through which the primary entity 202 can submit inputs (e.g., responses) and receive outputs (e.g., event artifacts).

In some implementations, the event monitoring application 204 transmits to the primary entity 202, via the one or more engagement channels of the multimodal interface 230, a first event artifact retrieved from the cache 222 and the second event artifact 220, thereby initiating a communication session 232. The communication session 232 is an interactive exchange between the AI agent 214 and the primary entity 202 during which the AI agent 214 presents one or more event artifacts and the primary entity 202 can provide responses, or inputs associated with the one or more event artifacts that request/provide follow-up information, direct related actions to be taken, and/or the like. By transmitting both the first event artifact (which was previously stored in the cache 222) and the second event artifact 220 together in a single communication session 232, the event monitoring application 204 reduces the total number of separate communications initiated with the primary entity 202. This approach provides a technical improvement over existing notification systems that transmit each event notification independently as events are detected, which can result in frequent interruptions to the primary entity 202 and increased computational overhead associated with establishing multiple communication channels. By caching the first event artifact until the second event artifact 220 is generated and then transmitting both artifacts together, the event monitoring application 204 consolidates communications and reduces the computational resources required for channel establishment, message transmission, and session management while enabling information of relatively high relevance/urgency to be transmitted to the primary entity 202 without unnecessary delay. Furthermore, the event monitoring application 204 can order the transmission of artifacts within the communication session 232 based on their respective priority metrics, enabling higher-priority artifacts to be presented before lower-priority artifacts regardless of the chronological order in which the underlying events were detected. For example, based on a determination that the second priority metric 217 is greater than a first priority metric associated with the first event artifact, the event monitoring application 204 can transmit the second event artifact 220 to the primary entity 202 before the first event artifact is transmitted to the primary entity 202. Alternatively, the second event artifact 220 and the first event artifact can be transmitted according to the order in which the artifacts are received.

In some implementations, the event monitoring application 204 can batch two or more event artifacts in the cache 222 until a particular condition is reached, at which point the batched artifacts are transmitted in the same communication session (e.g., in an order following one of the rules above). For example, artifacts can be batched in the cache 222 until a predetermined time window has elapsed, until a predetermined number of artifacts is cached, until a particular of the multimodal interface 230 satisfies a threshold for bandwidth availability, until a certain number of artifacts in a same category are cached, and/or the like. Additionally or alternatively, the event monitoring application 204 can delete an artifact from the cache 222 once the artifact has been stored within the cache 222 for longer than a predetermined duration and/or when the cache 222 reaches a maximum storage capacity. As with transmission, artifacts can be deleted in a priority order (e.g., oldest artifacts are deleted first, artifacts associated with lowest priority metrics are deleted first). These batching and discarding techniques can conserve computational resources of the event monitoring application 204 while preserving the relevancy of transmissions to the primary entity 202. For example, by batching artifacts according to one of the procedures above and then establishing a communication session, each communication session can be made more likely to include substantial information of relevance to the primary entity 202, helping to limit the expenditure of computational/network resources of communication session establishment to instances in which relevant information can be transmitted. As another example, deleting artifacts in the priority order can enable artifacts which are unlikely to be relevant to be deleted rather than processed and batched, reducing a number of artifacts transmitted by the event monitoring application 204 overall and thereby further conserving computational resources.

In some implementations, the AI agent 214 detects, via monitoring of the first data source 212-1 and/or the second data source 212-2, occurrence of a third event. In response to detecting the occurrence of the third event, the AI agent 214 assigns a third priority metric to the third event based on the set of primary entity properties 210. The third priority metric can be calculated in a same or generally similar manner to calculating the first priority metric 117 and the second priority metric 217 described above. In response to the third priority metric falling within a third predetermined metric range, the event monitoring application 204 discards the third event and the third priority metric from a memory of the event monitoring application 204 (e.g., a short term or long-term memory). The third predetermined metric range is a range of metric values that is below both the first predetermined metric range and the second predetermined metric range, indicating that events having priority metrics within the third predetermined metric range are unlikely to be of interest to the primary entity 202. By discarding events and associated priority metrics that fall within the third predetermined metric range rather than generating related artifacts, the event monitoring application 204 conserves computational resources and memory capacity that would otherwise be consumed by generating, storing, and managing event artifacts for events that are unlikely to result in meaningful interactions by the primary entity 202.

Example Action Execution Environment

Figure 3:
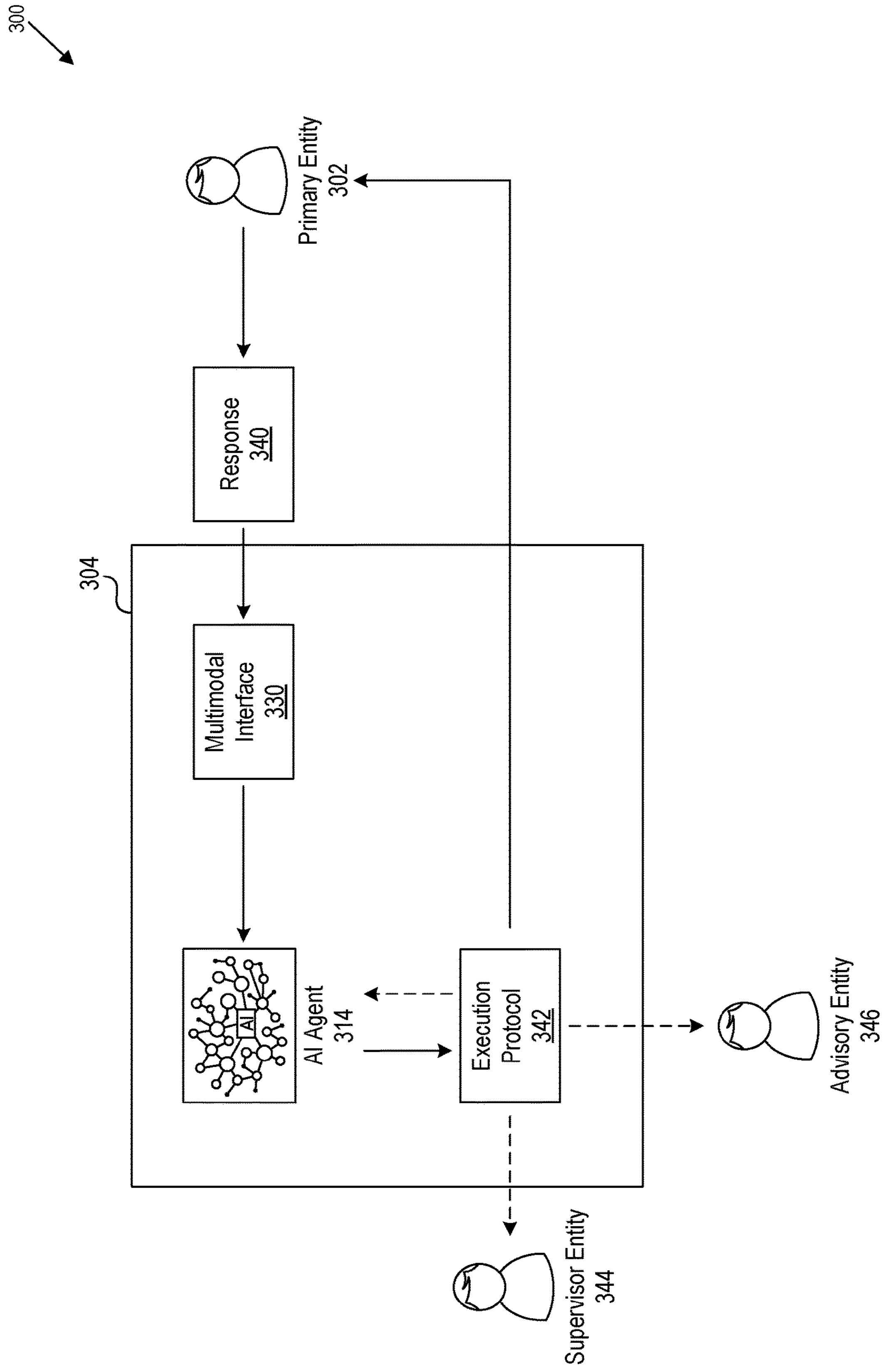
FIG. 3 is an illustration of an example action execution environment, in accordance with some implementations of the present technology.

FIG. 3 is an illustration of an example action execution environment 300, in accordance with some implementations of the present technology. The action execution environment 300 includes a primary entity 302, an event monitoring application 304, an AI agent 314, a multimodal interface 330, a response 340, an execution protocol 342, a supervisor entity 344, and an advisory entity 346. The primary entity 302, the event monitoring application 304, the AI agent 314, and the multimodal interface 330 can be the same as or generally similar to, respectively, the primary entity 202, the event monitoring application 204, the AI agent 214, and the multimodal interface 230 as described in relation to FIG. 2 above. The action execution environment 300 can be implemented using components of the example computer system illustrated and described in more detail with reference to FIG. 10. Likewise, implementations of the example action execution environment 300 can include different and/or additional components or can be connected in different ways.

In some implementations, the event monitoring application 304 receives, from the primary entity 302 via one or more engagement channels of the multimodal interface 330, a response 340 associated with an action based on at least one interaction described in an event artifact transmitted via the multimodal interface 330. The response 340 is a natural language input or structured data input provided by the primary entity 302 in reaction to one or more event artifacts transmitted to the primary entity 302 during a communication session. The response 340 can indicate an intent of the primary entity 302 to perform a particular action related to an available interaction described in an event artifact. For example, where an event artifact describes an available interaction to acquire additional shares of a public entity following a dividend declaration, the response 340 can be a natural language statement such as "reinvest the dividend" or a selection of a predefined action option presented through the multimodal interface 330. The response 340 can include parameters specifying details of the requested action, such as a quantity of shares to transact, a price limit, a time constraint, or other conditions governing execution of the action. The multimodal interface 330 can receive the response 340 through any of the supported engagement channels, including text-based channels, voice-based channels, or visual channels, and can provide the response 340 to the AI agent 314, which can parse the response 340 to extract the action and associated parameters.

In some implementations, the AI agent 314 determines an execution protocol 342 for performing the action indicated by the response 340. The execution protocol 342 specifies a manner in which the action is to be executed and a type of entity to be involved in said execution. For example, the execution protocol 342 can be automatic execution of the action by the AI agent 314, supervised execution of the action by the AI agent 314 under oversight of a supervisor entity 344, or transfer of the action to an advisory entity 346. The AI agent 314 can determine the execution protocol 342 based on one or more factors including the type of action requested, the magnitude or risk level of the action, account permissions associated with the primary entity 302, regulatory requirements applicable to the action, and/or historical patterns of action execution for the primary entity 302. For example, the AI agent 314 can apply a rule-based system or a trained classification model that receives the action type, action parameters, and primary entity properties as input and produces the execution protocol 342 as output.

In some implementations, the execution protocol 342 specifies automatic execution of the action by the AI agent 314. Automatic execution is an execution mode in which the AI agent 314 performs the action without requiring additional approval or oversight from a human or another AI agent. The AI agent 314 can select automatic execution when the action falls within predefined parameters that indicate low risk and/or high confidence in the appropriateness of the action. For example, automatic execution can be selected for routine transactions below a predetermined monetary threshold, for actions that the primary entity 302 has previously authorized for automatic processing, and/or for actions that do not require regulatory approval. When automatic execution is selected, the AI agent 314 can interface with one or more external systems (e.g., brokerage systems, banking platforms, custodial systems) to execute the action and can transmit a confirmation notification to the primary entity 302 via the multimodal interface 330 upon completion of the action.

In some implementations, the execution protocol 342 specifies supervised execution of the action by the AI agent 314 under oversight of the supervisor entity 344. The supervisor entity 344 is an entity that monitors and approves actions performed by the AI agent 314 before or during execution. The supervisor entity 344 can be a human individual, such as a compliance officer, a financial advisor, an advisory entity (as described in more detail below), or the primary entity 302 itself, or the supervisor entity 344 can be another AI agent configured to review and authorize actions based on predefined criteria. Supervised execution is an execution mode in which the AI agent 314 prepares the action for execution but requires approval from the supervisor entity 344 before completing the action. The AI agent 314 can select supervised execution when the action exceeds predefined risk thresholds, when the action involves asset classes or transaction types that require additional review, and/or when account permissions associated with the primary entity 302 mandate supervisory approval. When supervised execution is selected, the AI agent 314 can transmit a request for approval to the supervisor entity 344, which can include details of the proposed action, relevant context from the event artifact, and a recommendation from the AI agent 314. The supervisor entity 344 can approve the action, reject the action, or modify parameters of the action before approval. Upon receiving approval from the supervisor entity 344, the AI agent 314 executes the action and transmits a confirmation notification to the primary entity 302.

In some implementations, the execution protocol 342 specifies transfer of the action to the advisory entity 346. The advisory entity 346 is a human financial advisor or other entity capable of providing specialized financial advice that handles actions requiring expertise, authorization, and/or judgment beyond the capabilities of the AI agent 314. The advisory entity 346 can be a financial advisor, a wealth manager, a customer service representative, or another professional associated with the event monitoring application 304. Transfer to the advisory entity 346 is an execution mode in which the AI agent 314 does not execute the action but instead routes the action request to the advisory entity 346 for handling. The AI agent 314 can select transfer to the advisory entity 346 when the action involves complex financial instruments, when the action requires personalized advice that exceeds the scope of automated processing, when regulatory requirements mandate human involvement, and/or when the primary entity 302 has indicated a preference for human handling of certain action types. When transfer is selected, the AI agent 314 can compile relevant information including the response 340, the associated event artifact, the set of primary entity properties, and any additional context, and transmit this information to the advisory entity 346. The advisory entity 346 can then contact the primary entity 302 directly to discuss the action, provide recommendations, and/or facilitate execution of the action through appropriate channels.

In some implementations, the event monitoring application 304 causes performance of the action in accordance with the execution protocol 342. Causing performance of the action includes initiating the appropriate execution pathway based on the determined execution protocol 342 such that the action is completed or appropriately routed. For automatic execution, causing performance can include the AI agent 314 transmitting instructions to external systems to execute the action. For supervised execution, causing performance can include the AI agent 314 transmitting the approval request to the supervisor entity 344 and, upon receiving approval, transmitting instructions to external systems to execute the action. For transfer to the advisory entity 346, causing performance can include the AI agent 314 transmitting the action request and associated information to the advisory entity 346 and updating the status of the action in a tracking system accessible to the primary entity 302.

Example Method Flow

Figure 4:
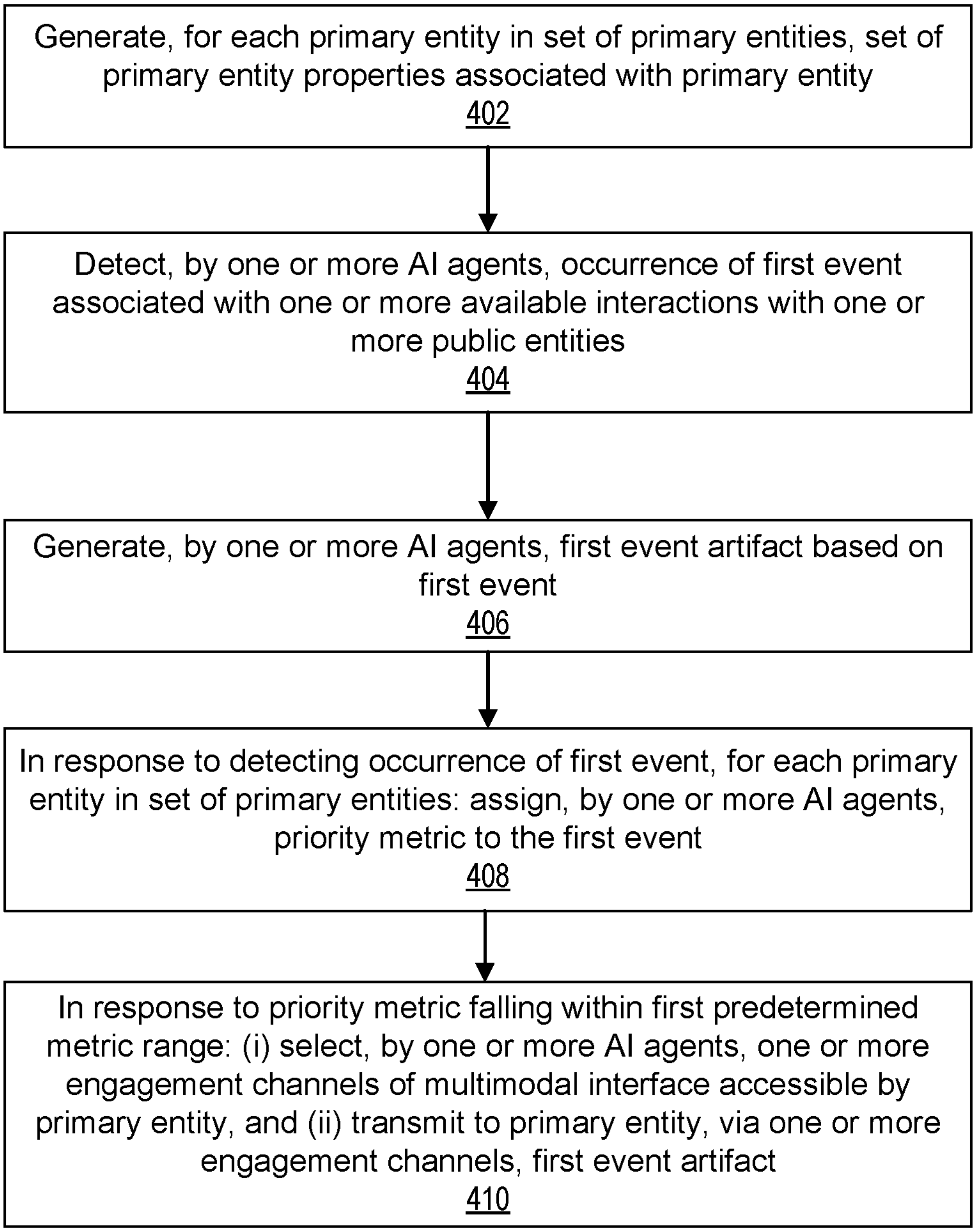
FIG. 4 is a flow diagram illustrating an example method for generating event artifacts and transmitting the event artifacts to primary entities via engagement channels of a multimodal interface, in accordance with some implementations of the present technology.

FIG. 4 is a flow diagram illustrating an example method 400 for generating event artifacts and transmitting the event artifacts to primary entities via engagement channels of a multimodal interface, in accordance with some implementations of the present technology. In some implementations, the method 400 is performed by components of the example computer system illustrated and described in more detail in relation to FIG. 10 below and/or the event monitoring application 104 described in relation to FIG. 1 above. Likewise, implementations can include different and/or additional operations or can perform the operations in different orders.

In operation 402, for each primary entity in a set of primary entities, a set of primary entity properties associated with the primary entity is generated. Each set of primary entity properties can be based on a history of interactions (e.g., ownership stake transactions, other financial exchanges) between the primary entity and one or more other entities. The set of primary entities can include a plurality of individuals, organizations, software applications, AI agents, and/or other actors/computer-implemented processes for which an event monitoring application monitors events and generates event artifacts. The set of primary entity properties can be the same as or generally similar to the primary entity properties 110 as described in relation to FIG. 1 above. The history of interactions can be the same as or generally similar to the history of interactions 108 as described in relation to FIG. 1 above. In some implementations, each set of primary entity properties includes at least one of a risk tolerance associated with a primary entity, a time horizon associated with a primary entity, an entity preference associated with a primary entity, an entity interaction composition associated with a primary entity, a liquidity profile associated with a primary entity, an engagement signal received from a primary entity, or an account permission associated with a primary entity.

In operation 404, occurrence of a first event associated with one or more available interactions with one or more public entities is detected by one or more AI agents. The one or more AI agents can be the same as or generally similar to the AI agent 114 as described in relation to FIG. 1 above. The first event can be the same as or generally similar to the first event 116 as described in relation to FIG. 1 above. In some implementations, the first event is detected via monitoring, by the one or more AI agents, of a plurality of sources indicating available interactions with one or more public entities, and the plurality of sources includes an Internet news source, a public entity value source, and an entity ownership source. The plurality of sources can include the data source 112-1 and the data source 112-2 as described in relation to FIG. 1 above. The first event may be at least one of a bond maturity event, a cash availability event, a ratings change event, or a lifecycle event.

In operation 406, a first event artifact is generated by the one or more AI agents based on the first event. The first event artifact can include a natural language message describing a first interaction with a first public entity that is currently available to the set of primary entities. The first event artifact can be the same as or generally similar to the first event artifact 120 as described in relation to FIG. 1 above. The first event artifact can describe an available interaction such as acquiring, selling, or rebalancing an ownership stake in the first public entity based on the detected first event.

In operation 408, in response to detecting the occurrence of the first event, for each primary entity in the set of primary entities, a priority metric is assigned to the first event by the one or more AI agents. The priority metric can be based on the set of primary entity properties associated with the primary entity. The priority metric can be the same as or generally similar to the first priority metric 117 as described in relation to FIG. 1 above. Because the priority metric can be calculated based on the set of primary entity properties specific to each primary entity, the same first event can receive different priority metrics for different primary entities in the set of primary entities, reflecting the varying relevance of the first event to each primary entity based on their individual characteristics, preferences, and circumstances. In some implementations, occurrence of a second event is detected by the one or more AI agents. In response to detecting occurrence of the second event, a second priority metric is assigned to the second event by the one or more AI agents, wherein the second priority metric is based on each set of primary entity properties associated with the primary entities. In response to the second priority metric falling within a second predetermined metric range, the second event and the second priority metric are discarded from a memory. This enables the event monitoring application to filter out events that are not sufficiently relevant to any of the primary entities, conserving computational resources and reducing unnecessary communications.

In operation 410, in response to the priority metric falling within a first predetermined metric range, (i) one or more engagement channels of a multimodal interface accessible by the primary entity are selected by the one or more AI agents and (ii) the first event artifact is transmitted to the primary entity via the one or more engagement channels. The multimodal interface can be the same as or generally similar to the multimodal interface 230 as described in relation to FIG. 2 above. The one or more engagement channels can include text-based channels, voice-based channels, and/or visual channels as described in relation to FIG. 2 above. The selection of engagement channels can be based on engagement signals included in the set of primary entity properties that indicate preferred communication modalities of the primary entity. The transmission of the first event artifact can initiate a communication session between the one or more AI agents and the primary entity, and the communication session can be the same as or generally similar to the communication session 232 as described in relation to FIG. 2 above. Determining whether the priority metric for a particular primary entity falls within the first predetermined metric range before transmitting the first event artifact to that primary entity conserves computational resources, as the number of communication sessions that are established is reduced to only the number of primary entities for which information included in the first event artifact is above a particular relevance/urgency threshold. Thus, computational resources that would otherwise be spent on transmitting the first event artifact to all primary entities in the set of primary entities can be conserved while still delivering information to those primary entities for which the information is particularly relevant.

In some implementations, before transmitting the first event artifact to the primary entity, the first event artifact is customized based on the set of primary entity properties associated with the primary entity. This customization enables the first event artifact to be modified for each primary entity such that the same underlying event information to be presented in a manner tailored to each primary entity's communication preferences, financial sophistication, specific circumstances, and/or other factors.

In some implementations, a response associated with an action based on the first interaction is received from the primary entity via the one or more engagement channels. An execution protocol for performing the action is determined by the one or more AI agents, and the action is performed in accordance with the execution protocol. The response can be the same as or generally similar to the response 340 as described in relation to FIG. 3 above. The execution protocol can be the same as or generally similar to the execution protocol 342 as described in relation to FIG. 3 above. The execution protocol can be either automatic execution of the action by the one or more AI agents, supervised action by the one or more AI agents, or transfer to an advisory entity. The advisory entity can be the same as or generally similar to the advisory entity 346 as described in relation to FIG. 3 above.

Example Artifact Execution Environment

Figure 5:
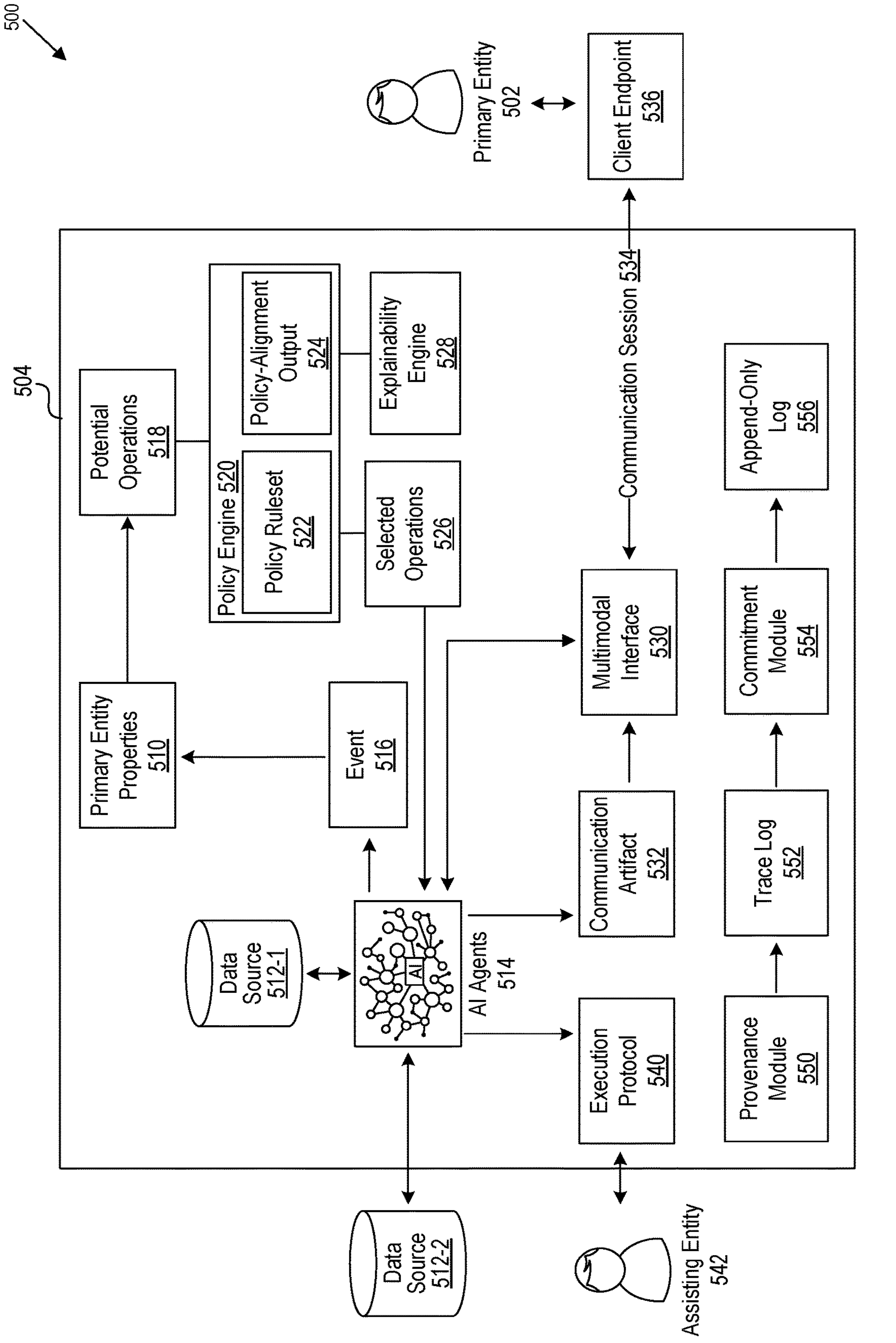
FIG. 5 is an illustration of an example event monitoring and operation execution environment, in accordance with some implementations of the present technology.

FIG. 5 is an illustration of an example event monitoring and operation execution environment 500, in accordance with some implementations of the present technology. The environment 500 can include a communication session signal controller 504 ("controller 504") configured to receive update signals pertaining to events and support a communication session with a primary entity. The environment 500 can include an event monitoring and/or operation execution application (e.g., executed on the controller 504) configured to enable a primary entity 502 to receive one or more communication artifacts 532 and responsively cause the performance of one or more operations. The primary entity 502, controller 504, and communication artifact 532 can be the same as, similar to, and/or perform functions of the primary entity 102, event monitoring application 104, and/or event artifact 120, respectively, described with reference to FIG. 1. The primary entity 502 and controller 504 can be the same as, similar to, and/or perform functions of the primary entity 302 and/or event monitoring application 304, respectively, described with reference to FIG. 3. The environment 500 can be implemented using components of the example computer system illustrated and described in more detail with reference to FIG. 12. Likewise, implementations of the example environment 500 can include different and/or additional components or can be connected in different ways.

The primary entity 502 can be one or more individuals (e.g., users) and/or clients, such as an organization, a software application, an AI agent, and/or any other actor and/or computer-implemented process that can access and/or interact with the controller 504. The controller 504 can collect information associated with the primary entity 502, proactively generate communication artifacts (e.g., event artifacts) that can be informative, useful, and/or otherwise relevant to the primary entity 502, and/or initiate communication sessions to provide communication artifacts to the primary entity 502. In some implementations, the primary entity 502 performs one or more interactions with one or more other entities. For example, these other entities can be public entities (e.g., corporations) and/or any other business entities for which ownership stakes (e.g., publicly traded stocks or other shares) can be transacted, and the interactions can be transactions, inquiries, and/or other actions associated with those ownership stakes. The primary entity 502 can perform the interactions via executable operations performed by the controller 504 (e.g., by the AI agents 514).

The environment 500 (e.g., the controller 504) can include one or more AI agents 514 (collectively, "AI agents 514"). The AI agents 514 can be the same as, similar to, and/or perform functions of the AI agent 114 described with reference to FIG. 1, AI agent 214 described with reference to FIG. 2, and/or AI agent 314 described with reference to FIG. 3. Each AI agent of the AI agents 514 can be a combination of hardware and/or software corresponding to a respective computer-executable operation set, where the computer-executable operations are configured to be autonomously executed by the AI agent on a respective software application set. For example, an AI agent can invoke a neural network, decision tree, or other ML algorithm trained to interpret information about a public entity (e.g., natural language information, such as a news article or earnings report), and use the information and/or context data (e.g., from one or more data sources 512 (collectively, "data sources 512")) to determine and/or infer an occurrence of an event. In some implementations, the AI agents 514 include one or more components of the example transformer 1012 described in relation to FIG. 10 and/or the AI system 1100 described in relation to FIG. 11. The AI agents 514 can implement algorithmic validation modules that cross-reference potential operations against a configurable set of governance rules, technical standards, and/or user-specified preferences prior to authorization or execution.

The AI agents 514 can be enabled to perform operations that cause interactions with one or more entities (collectively, "entities") on behalf of the primary entity 502. For example, the AI agents 514 can be configured to transmit requests to an external service associated with an entity, such as an application programming interface (API), such that the request causes an interaction between the entity and the primary entity 502 (e.g., submitting an inquiry and/or receiving a response, selling an ownership stake, acquiring additional shares). Additionally, or alternatively, the AI agents 514 can be configured to transmit interaction data (e.g., natural language instructions) to an assisting entity 542 capable of performing the interaction on behalf of the primary entity 502.

The AI agents 514 can be coupled to the data sources 512 (e.g., be able to obtain data from and/or transmit data to the data sources 512). The data sources 512 can include internal telemetry, event buses, third-party feeds, documents, or queryable APIs. The data sources 512 can include one or more internal data sources, such as data source 512-1. For example, the data source 512-1 can include entity information, primary entity information, organizational policies, information pertaining to the AI agents 514, and the like. Entity information can include entity names, entity value data (e.g., indicating the values of shares of public entities), ownership information (e.g., indicating ownership of public entities by the primary entity 502), and/or interaction information about entities, such as available operations that can be performed by the AI agents 514 to interact with the entities. The primary entity information can include stored information about the primary entity 502, such as the primary entity properties 510. The primary entity properties 510 can be the same as, or similar to, the primary entity properties 110 and/or the first subset 118 described in reference to FIG. 1. For example, the primary entity properties 510 can be compiled based on a history of interactions (e.g., stored in the data source 512-1), and can include a risk tolerance (e.g., a risk metric tolerance), a time horizon, an entity preference, account information, portfolio position data, entity interaction composition (e.g., indicating ownership stakes), liquidity profile, account activity, engagement signals, account permissions, and so on. Organizational policies can be compliance standards that an organization requires the AI agents 514 to comply with. For example, the organizational policies can include a limit on a frequency of communication initiation attempts, a style of communication (e.g., tone, language, modality, and the like), organizational branding included in the communications, content required to be present in communications (e.g., required risk and/or legal disclosures), and/or one or more external regulations that the AI agents 514 are required to comply with. Information pertaining to the AI agents 514 can include capabilities of an AI agent (e.g., a description of the respective computer-executable operation set), operating parameters of the AI agent (e.g., AI model size, required computational resources), and/or a compliance of the AI agent (e.g., identifying a compliance standard that the AI agent is trained and/or configured to conform to). In some implementations, the data source 512-1 can be the same as, similar to, and/or include data of the data source 112-1 and/or data source 212-1 described with reference to FIG. 1 and FIG. 2, respectively.

The data sources 512 can include one or more external data sources, such as data source 512-2. For example, the data source 512-2 can include entity information, external regulations, and the like. The entity information can include updates pertaining to entities, such as news articles, press releases, earnings reports, and the like. External regulations can be compliance standards required by external organizations, and can include relevant regulations and/or standards that apply to entities, the primary entity 502, the AI agents 514, and/or any interactions therebetween. External regulations can include legal regulations, financial obligations, reporting requirements, data security requirements, disclosure requirements, and so on. In some implementations, the data source 512-2 can be the same as, similar to, and/or include data of the data source 112-2 and/or data source 212-2 described with reference to FIG. 1 and FIG. 2, respectively. In some implementations, data described with respect to the data source 512-2 can be stored on and/or retrieved from the data source 512-1, and data described with respect to the data source 512-1 can be stored on and/or retrieved from the data source 512-2.

In some implementations, the AI agents 514 and/or other AI agents can monitor (e.g., continuously or at predetermined time intervals) data sources 512 to detect an occurrence of an event 516 associated with available interactions with one or more public entities (e.g., available transactions of ownership stakes in the public entities). For example, AI agents (e.g., including the AI agents 514) can receive input data (e.g., update signals including natural language and/or numerical data) from the data sources 512, analyze the input data, and determine and/or infer an outcome associated with public entities that is reflected by, or likely to occur based on, the input data. Based on this analysis, the AI agents can then generate an output indicating an actual and/or a predicted occurrence of the event 516. The outcome can include a change in entity information (e.g., value of shares) and/or a change in available interactions and/or available operations. In some implementations, the output can indicate both an actual occurrence (e.g., a poor earnings report) and a predicted occurrence and/or consequence (e.g., decrease in share values).

The controller 504 can (e.g., in response to detecting the occurrence of the event 516) identify one or more primary entity properties 510. The primary entity properties 510 can be identified based on an alignment between primary entity properties (e.g., accessible by and/or stored in the controller 504) and one or more available operations. For example, the event 516 can pertain to a particular entity associated with the available operations, and the primary entity properties 510 can identify a preference for the particular entity. In some implementations, the primary entity properties 510 correspond to a subset of a larger set of primary entity properties. For example, the primary entity properties 510 can correspond to the first subset 118 described with reference to FIG. 1, and can be determined based on an association with a category of the event 516.

In some implementations, the primary entity properties 510 can be stored in an entity property repository (e.g., data source 512-1) that contains properties pertaining to one or more primary entities. In some implementations, the event 516 is identified based on the primary entity properties 510. For example, the controller 504 can store data pertaining to events (e.g., in the data source 512-1), periodically compare the primary entity properties 510 to a set of stored events, and identify the event 516 based on an alignment between the primary entity properties 510 and the event 516.

The controller 504 can determine a set of potential operations 518 (collectively, "potential operations 518") based on the event 516 and the primary entity properties 510. Each potential operation 518 can be an available operation that can be executed by the AI agents 514 to cause an interaction between an entity and the primary entity 502 (e.g., an operation performed on behalf of the primary entity 502). For example, the available operations can be filtered using the primary entity properties 510 to determine the set of potential operations 518. The potential operations 518 can be identified based on an ability of the primary entity 502 to perform an associated interaction. For example, if it is determined (e.g., via the primary entity properties 510) that the primary entity 502 does not have an ownership stake in an entity, then the potential operations 518 can exclude an operation that causes the primary entity 502 to sell ownership stakes in the entity. In some implementations, the potential operations 518 are generated by the AI agents 514. For example, AI agents 514 can be configured and/or trained to receive a description of the event 516 and/or the primary entity properties 510 and generate the set of potential operations 518. In some implementations, the potential operations 518 include multimodal data generated for a communication session between the primary entity 502 and the AI agents 514 (e.g., when the potential operations 518 are generated rather than retrieved from a data source).

In some implementations, determining the set of potential operations 518 includes determining operations that are not available to the AI agents 514. For example, if a particular operation is defined but cannot be executed (e.g., an operation to query an API that is not currently online), the particular operation can be excluded from the potential operations 518. Alternatively, or additionally, potential operations 518 can be included with associated parameters defining the circumstances under which the operation can be performed. For example, associated parameters can include deadlines, available times, additional operations that are required, and so on. In some implementations, a potential operation 518 can include multiple operations and/or be associated with multiple entities. For example, a potential operation 518 can include selling an ownership stake in a first entity while subsequently and/or simultaneously gaining an ownership stake in a second entity.

The controller 504 can identify one or more selected operations 526 (collectively, "selected operations 526"). The selected operations 526 can correspond to interactions that are available to the primary entity 502 and that have an alignment with the primary entity properties 510.

In some implementations, the controller 504 uses a policy engine 520 to identify the selected operations 526. The policy engine 520 can include a policy ruleset 522. The policy ruleset 522 can define a structured representation of compliance standards, regulatory rules, enterprise risk policies, risk metric definitions, security policies, governance rules, technical standards, and/or user-specified preferences that the AI agents 514 can cross-reference against the potential operations 518 prior to authorization or execution. The policy ruleset 522 can be represented as a rules graph, a decision table, a domain-specific language (DSL), and/or another structured format that encodes conditional logic for evaluating potential operations. One or more rules of the policy ruleset 522 can be applied to the potential operations 518 to generate a policy-alignment output 524, such as an output (e.g., a score) indicating a degree of alignment between the potential operation 518 and the policy ruleset 522. Additionally, or alternatively, the policy ruleset 522 can include computer-executable validation rules that can be applied to potential operations 518 to determine a degree of alignment between the potential operations 518 and the policy ruleset 522.

In some implementations, each rule in the policy ruleset 522 can include a rule identifier, one or more conditions (e.g., predicates that evaluate properties of a potential operation 518 and/or the primary entity properties 510), one or more actions (e.g., approve, reject, flag for review, generate output score), and/or a priority indicator for resolving conflicts between rules. In some implementations, the policy ruleset 522 is maintained under version control, and each version can be associated with a version identifier to enable verification that a particular version of the policy ruleset 522 was applied during evaluation of potential operations 518. In some implementations, the policy ruleset is stored in the data source 512-1 and/or the data source 512-2 and is retrieved by the AI agents 514 when evaluating potential operations 518. The policy engine 520 and the policy ruleset 522 are described in more detail below with reference to FIG. 6.

Identifying the selected operations 526 can include generating (e.g., by the AI agents 514) one or more execution risk metrics (collectively, "execution risk metrics") of potential operations 518. For example, the AI agents 514 can process the event 516, properties of an entity, primary entity properties 510, and/or additional assistance data (e.g., compliance standards) to identify sources of risk associated with executing a potential operation, predict possible negative outcomes associated with the potential operation, and/or estimate a likelihood of the possible negative outcomes. The execution risk metrics can include risk scores and risk descriptions. A risk score can be a numerical value (e.g., a number between 0 and 100), a category, a level (e.g., "low," "high," "critical"), and so on that characterizes a relative amount of inferred risk associated with executing the proposed operation. A risk description can include a natural language description identifying a degree of risk, sources of risk, potential negative outcomes, an explanation of how the sources of risk could lead to the potential negative outcomes, and/or an explanation of the reasons for concluding that the sources of risk could lead to the potential negative outcomes. The execution risk metrics can be generated by applying one or more rules-based algorithms (e.g., applying rules of a policy ruleset 522, comparing the potential operation to operations with known risk scores, and so on) and/or by applying one or more ML models (e.g., the AI agents 514). The execution risk metrics can be used to identify the selected operations 526. For example, execution risk metrics of a potential operation can be compared to the primary entity properties 510, such as a risk metric threshold included in the primary entity properties 510, to determine a degree of alignment between the potential operation and the primary entity properties 510.

Identifying the selected operations 526 can include comparing a potential operation and/or the primary entity properties 510 to a set of compliance standards (e.g., as contained and/or represented in the policy ruleset 522). The compliance standards can include internal compliance standards, such as organizational policies, and external compliance standards, such as legal regulations. The controller 504 (e.g., the AI agents 514) can determine a degree of alignment between the potential operation and the compliance standards (e.g., a degree of adherence to the compliance standards). For example, the AI agents 514 can determine a degree to which the potential operation complies with the compliance standards and/or a degree to which performance of the operation on behalf of the primary entity 502 complies with the compliance standards (e.g., based on primary entity properties 510, such as a jurisdiction, legal status, and so on). In some implementations, the controller 504 generates compliance alignment scores that quantify a degree of alignment between the potential operation and the compliance standards. Each potential operation can be associated with a different set of compliance standards. The potential operations 518 can be compared to compliance standards using one or more rules-based algorithms (e.g., searching the potential operation for prohibited and/or required actions or disclosures) and/or by applying one or more ML models (e.g., the AI agents 514).

In some implementations, identifying the selected operations 526 includes identifying an alignment between a potential operation and one or more objectives included in the primary entity properties 510. For example, the objectives can represent financial targets, investment goals, and/or other outcomes intended by the primary entity 502. The AI agents 514 can compare predicted results of a potential operation against the objectives to determine a degree of alignment. For example, the AI agents can calculate a projected impact of the potential operation on progress toward a specified objective and/or can determine whether the potential operation would advance, maintain, or hinder achievement of the objective.

In some implementations, identifying the selected operations 526 includes evaluating a time horizon associated with the primary entity. For example, the one or more AI agents can compare a time horizon property of the primary entity properties 510 against temporal characteristics of the potential operations 518 to identify one or more potential operations that align with the primary entity's investment duration preferences. In some implementations, identifying the selected operations 526 includes evaluating liquidity profile information of the primary entity properties 510. For example, the liquidity profile information can be used to determine whether the primary entity 502 has sufficient liquid assets to perform a particular operation and/or whether the operation would result in a liquidity position that satisfies constraints and/or preferences included in the primary entity properties 510. The time horizon and/or liquidity evaluation can be performed by comparing numerical values representing the primary entity's time horizon and/or liquidity requirements against corresponding attributes of each of the potential operations 518.

In some implementations, determining the one or more selected operations 526 can include using historical preferences of the primary entity 502. The historical preferences can include records of previous operations that the primary entity 502 has confirmed, rejected, and/or suggested during prior communication sessions. For example, the AI agents 514 can analyze patterns in prior responses and identify operation categories, entity categories, and/or risk levels that the primary entity 502 has historically accepted. In some implementations, the AI agents 514 can use engagement signals derived from interactions of the primary entity 502 (e.g., with the controller 504, AI agents 514, and/or other service applications) to infer preferences. The engagement signals can include engagement metrics (e.g., frequency of logins, duration of sessions, and/or feature utilization patterns), response times to prior communication artifacts, and/or modifications that the primary entity 502 has made to previously selected operations.

In some implementations, determining the selected operations 526 includes quantifying a confidence for the potential operations 518. For example, the controller 504 (e.g., the AI agents 514) can generate confidence scores for one or more selected operations 526. The confidence scores can quantify a degree of certainty associated with the potential operations 518, such as certainty of execution risk metrics, relevance, outcomes, and so on. For example, the AI agents 514 can generate confidence scores based on a completeness of data used to evaluate the potential operations 518 and/or a consistency of signals received from multiple data sources. Additionally, or alternatively, the confidence scores can be based on historical accuracy of predictions made by the AI agents 514 for similar potential operations. In some implementations, determining the one or more selected operations 526 includes evaluating a respective urgency associated with the potential operations 518. An urgency evaluation can indicate a time sensitivity based on factors such as expiration dates, market conditions, market volatility, and/or deadlines. In some implementations, the controller 504 generates an urgency score that characterizes a relative urgency of a respective potential operation 518.

In some implementations, determining the selected operations 526 includes evaluating priority metrics for the event 516 and/or related events associated with the potential operations 518. The priority metrics can indicate a relevance of each event to the primary entity 502 based on the primary entity properties 510. For example, the controller 504 can identify a selected operation by comparing priority metrics across multiple events and identifying a potential operation associated with the event 516 having the highest priority metric. Additionally, or alternatively, the controller 504 can filter potential operations 518 to exclude those associated with events having priority metrics below a threshold value.

In some implementations, the controller 504 generates one or more policy-alignment outputs 524 (collectively, "policy-alignment outputs 524") for the potential operations 518. The policy-alignment outputs 524 can be numerical (e.g., a number between 0 and 100), a category, and/or a level (e.g., "low," "medium," "high"). The policy-alignment output of a potential operation can characterize a suitability of the potential operation based on an alignment with the primary entity properties 510 and/or an adherence to a respective set of compliance standards. Determining a policy-alignment output for a potential operation can include processing factors described above with reference to identifying the selected operations 526. For example, determining a policy-alignment output can include processing execution risk metrics (e.g., for comparison to a risk threshold), a degree of alignment with an objective of the primary entity 502, historical preferences of the primary entity 502, an urgency of the potential operation and/or the event 516, and so on. The policy-alignment outputs 524 can be determined using a rules-based algorithm and/or an ML model (e.g., the AI agents 514).

In some implementations, the controller 504 generates the policy-alignment outputs 524 using one or more validation algorithms. The validation algorithms can be rules in the policy ruleset 522. The validation algorithms can include a weighted scoring algorithm that assigns numerical weights to a plurality of factors (e.g., risk score, compliance alignment score, urgency score) and aggregates the weighted values to produce the policy-alignment output. Additionally, or alternatively, the validation algorithms can include a threshold-based validation algorithm that evaluates each potential operation against a set of predefined thresholds and determines policy alignment based on whether the potential operation satisfies each threshold or a predefined number of thresholds. In some implementations, the validation algorithms include a multi-criteria decision analysis algorithm that evaluates potential operations across multiple dimensions and ranks the potential operations based on a combination of criteria. The multi-criteria decision analysis algorithm can use techniques such as analytic hierarchy process (AHP), technique for order of preference by similarity to ideal solution (TOPSIS), and/or weighted product model (WPM) to rank the potential operations 518.

The selected operations 526 can be identified based on the policy-alignment outputs 524. For example, the controller 504 can be configured to identify all potential operations 518 that satisfy a threshold, such as potential operations with policy-alignment outputs within a range of values (e.g., above a threshold value) and/or policy-alignment outputs of particular levels. Additionally, or alternatively, the controller 504 can be configured to identify a predetermined number of potential operations 518 (e.g., a single potential operation) as the selected operations 526, and choose the potential operations 518 with the best policy-alignment outputs 524.

In some implementations, the controller 504 determines that none of the potential operations 518 are selected operations 526. For example, the controller 504 can determine that none of the potential operations 518 are significant and/or urgent enough to cause a communication session 534 with the primary entity 502. In some implementations, the controller 504 determines that none of the policy-alignment outputs 524 exceed a threshold (e.g., a minimum threshold value) and identifies none of the potential operations 518 as selected operations 526. The system can store information pertaining to the potential operations 518 for later usage and/or retrieval. For example, the controller 504 can aggregate potential operations 518 and cause presentation of at least one potential operation 518 to the primary entity 502 through other means (e.g., an email, notification, short message service (SMS) text, and so on) or at a later date (e.g., during a subsequently initiated conversation, as part of a weekly update email, and so on).

Figure 6:
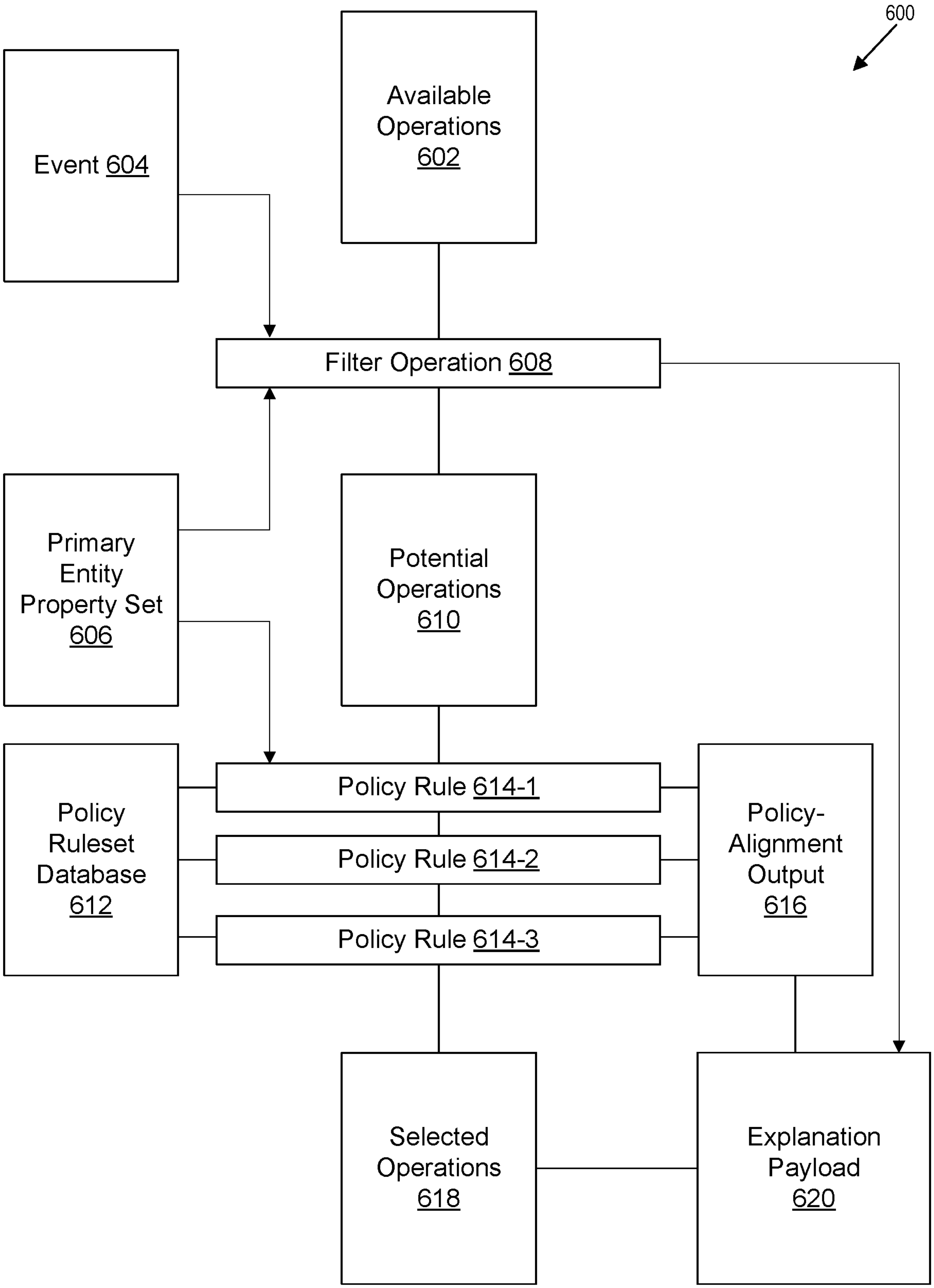
FIG. 6 is an illustration of an example policy evaluation pipeline, in accordance with some implementations of the present technology.

FIG. 6 is an illustration of an example policy evaluation pipeline 600, in accordance with some implementations of the present technology. The policy evaluation pipeline 600 can apply a filter operation 608 and/or one or more policy rules 614 to identify one or more selected operations 618 from available operations 602 and/or potential operations 610. In some implementations, components and operations described with reference to FIG. 6 are be implemented by the policy engine 520 described with reference to FIG. 5. The event 604, primary entity property set 606, potential operations 610, and selected operations 618 can be the same as or similar to the event 516, primary entity properties 510, potential operations 518, and/or selected operations 526, respectively, as described with reference to FIG. 5. The policy evaluation pipeline 600 can be implemented using components of the example computer system illustrated and described in more detail with reference to FIG. 12. Likewise, implementations of the policy evaluation pipeline 600 can include different and/or additional components or can be connected in different ways.

The filter operation 608 can receive inputs including the available operations 602, the event 604, and/or the primary entity property set 606. The available operations 602 can include operations that are available to be performed by one or more AI agents on behalf of a primary entity. The filter operation 608 can process the available operations 602 using the event 604 and/or the primary entity property set 606 to generate potential operations 610. The potential operations 610 can represent a subset of the available operations 602 that are capable of being successfully executed by the AI agents. The filter operation 608 can exclude operations that are not currently available to be executed and/or that do not correspond to interactions that the primary entity can perform.

The potential operations 610 can be evaluated against a policy ruleset loaded from a policy ruleset database 612. The policy ruleset database 612 can contain a plurality of policy rulesets (e.g., policy ruleset 522 of FIG. 5), where each policy ruleset includes one or more policy rules, such as policy rule 614-1, policy rule 614-2, and policy rule 614-3. The policy ruleset database 612 can store policy rulesets associated with different contexts, such as different entity types, event categories, jurisdictions, regulatory frameworks, and/or primary entity properties. The policy evaluation pipeline 600 can retrieve a policy ruleset from the policy ruleset database 612 based on contextual factors associated with the event 604, the primary entity property set 606, and/or the potential operations 610. Each policy rule can define constraints, conditions, actions, and/or priority indicators for evaluating potential operations against governance regulations, technical standards, and/or primary entity properties (e.g., preferences, objectives, risk metric thresholds). In some implementations, the policy ruleset database 612 can implement version control to store multiple versions of policy rulesets. Each policy ruleset can be identified along with a version identifier to enable verification that a particular version of a policy ruleset was applied during evaluation.

The policy evaluation pipeline 600 can apply the policy rules 614-1, 614-2, and 614-3 to the potential operations 610 to generate policy-alignment outputs 616. Applying the policy rules can include any of the operations described with reference to FIG. 5 for identifying selected operations, such as evaluating priority metrics, identifying alignment between a potential operation and one or more objectives, comparing execution risk metrics to risk metric thresholds, evaluating time horizons, evaluating liquidity profiles, quantifying confidence scores, evaluating urgency, using historical preferences of the primary entity, and so on. The policy-alignment outputs 616 can include one or more policy-alignment output for each policy rule 614 applied to each potential operation 610. The policy-alignment output 616 can characterize a degree of alignment between each potential operation 610 and the primary entity property set 606, and/or a degree of adherence between each potential operation and the policy ruleset. The policy-alignment output 616 can be numerical, categorical, and/or level-based.

Based on the policy-alignment outputs 616, the policy evaluation pipeline 600 can identify selected operations 618 from the potential operations 610. The selected operations 618 can correspond to operations that satisfy threshold requirements and/or that have favorable policy-alignment outputs 616 relative to other potential operations 610.

The policy evaluation pipeline 600 can collect and/or generate an explanation context 620 that captures contextual factors contributing to the identification of the selected operations 618. The explanation context 620 can include indications of the policy rules applied (e.g., rule identifiers and/or outcomes), the policy-alignment outputs 616, the constraint evaluation outputs, the data sources used, the reasoning frameworks applied, and/or other factors influencing the identification of the selected operations 618. The explanation context 620 can be used by an explainability engine (e.g., the explainability engine 528 described with reference to FIG. 5) to assemble natural language, structured, and/or visual descriptions and/or explanations for the selected operations 618. The explanation context 620 can be included in a trace log and/or stored in an append-only log, such as trace log 552 and/or append-only log 556 described with reference to FIG. 5. The systematic capturing and providing of the explanation context allows for automated and consistent recording of deterministic audit records, allowing all interactions and inferences to be reliably captured tor compliance validation and enforcement.

Once the controller 504 has identified the selected operations 526, the controller 504 can identify an execution protocol 540 for the selected operations 526. For example, if the selected operations 526 have a favorable policy-alignment output, low risk metric value, high urgency, high degree of alignment with historical actions by the primary entity 502, and so on, then the AI agents 514 can automatically execute the selected operations 526 without informing the primary entity 502 and/or automatically execute the selected operations 526 and subsequently inform the primary entity 502. Alternatively, or additionally, the AI agents 514 can inform the primary entity 502 and/or an assisting entity 542 and wait for further input before executing the selected operations 526.

The controller 504 can implement dedicated logic engines to record and store contextual factors that contributed to the identification of the potential operations 518, the selected operations 526, and/or the execution protocol 540. For example, the controller 504 can identify relevant contextual factors (e.g., comparison to compliance standards, alignment with primary entity properties 510, reasoning frameworks used, values for policy-alignment outputs 524) and store the information. In some implementations, the logic engines store natural language descriptions of the contextual factors and/or natural language explanations of how the contextual factors influenced the identification of the potential operations 518 and/or the selected operations 526.

The controller 504 can include an explainability engine 528. The explainability engine 528 can receive data from the policy engine 520, the provenance module 550, the AI agents 514, and/or an execution protocol state machine, and generate natural language descriptions and/or explanations based on the received data. For example, the explainability engine 528 can receive policy-alignment outputs 524, execution risk metrics, constraint evaluation outputs, explanation context data (e.g., explanation context 620 described with reference to FIG. 6), data source lineage information captured by the provenance module 550, contextual factors recorded by the dedicated logic engines, and/or an indication of an execution protocol 540. The explainability engine 528 can process the received data to generate natural language explanations describing the event 516, the potential operations 518, the selected operations 526, factors influencing the identification of the selected operations 526, policy rules applied during evaluation (e.g., rule identifiers and/or outcomes), data sources used, reasoning frameworks applied, and/or degrees of alignment between the selected operations 526 and the primary entity properties 510 and/or policy ruleset 522. In some implementations, the explainability engine 528 generates explanations in a multimodal format. For example, the explanations can include text, audio data, and/or video data. Additionally, or alternatively, the explainability engine 528 can generate explanations in a structured data format and/or a visual format (e.g., charts, graphs, diagrams, and/or color-coded indicators). The explainability engine 528 can generate explanations for inclusion in communication artifacts 532, compliance reports, and/or trace log entries stored in the trace log 552.

The AI agents 514 can cause presentation of the selected operations 526 to the primary entity 502. For example, the AI agents 514 can initiate a communication session 534 with the primary entity 502 and maintain multimodal communication with the primary entity 502 via the multimodal interface 530. The multimodal interface 530 can be a communication interface that supports multiple modalities for transmitting information to and/or receiving information from the primary entity 502. The multimodal interface 530 can be the same as, similar to, and/or perform functions of the multimodal interface 230 described in reference to FIG. 2. Each modality can be associated with an engagement channel, including a text-based channel, voice-based channel, and/or visual channel. The AI agents 514 can identify one or more engagement channels (collectively, "engagement channels") for communication with the primary entity 502. For example, the engagement channels can be identified based on engagement signals of the primary entity properties 510 indicating a preferred engagement channel, properties of the event 516 (e.g., priority, urgency), properties of the potential operations 518 (e.g., if a potential operation can be understood more easily in a particular modality), and so on.

The multimodal interface can include an avatar within one or more of the supported communication modalities. The avatar can manifest as a text-based persona, a voice-based persona, and/or a visual persona. A visual persona can include a video-based persona (e.g., two-dimensional or three-dimensional animated figure) or an image-based persona (e.g., a series of static images that correspond to content being communicated). In some implementations, the avatar combines multiple modalities by presenting as a two-dimensional or three-dimensional animated figure that exhibits body gestures that correspond to the content being communicated. The avatar can operate as a point of interaction through which the primary entity 502 can submit inputs (e.g., responses) and/or receive outputs (e.g., communication artifacts).

In some implementations, the multimodal interface comprises and/or is connected to a client endpoint 536. The client endpoint 536 can be used by the primary entity 502 to interact with the controller 504 (e.g., via a secure network connection). The client endpoint 536 can include a network address, a client device, and/or a client application that can function as a client interface. In some implementations, the client endpoint 536 hosts an avatar. For example, the multimodal interface 530 can transmit text, audio data, and/or instructions for causing the client endpoint 536 to present one or more visual avatar representations (e.g., video and/or image representations). Additionally, or alternatively, the multimodal interface 530 can transmit text and/or instructions for causing the client endpoint 536 to present one or more audio avatar representations (e.g., text-to-speech) and/or visual avatar representations. In some implementations, the client endpoint 536 is configured to cause presentation of the avatar (e.g., a hosted avatar) using local resources (e.g., data directly accessible by the client endpoint 536 without a network connection). In some implementations, the multimodal interface 530 is included in the client endpoint 536. For example, the controller 504 (e.g., the AI agents 514) can transmit the communication artifact 532 to the multimodal interface 530 of the client endpoint 536 for presentation to the primary entity 502.

The AI agents 514 can generate a communication artifact 532. The communication artifact 532 can be a multimodal communication artifact and can include text, audio data, image data, and/or video data. The communication artifact 532 can include a natural language description (e.g., in one or more modalities) describing information that is relevant to the primary entity 502 in making a decision of whether to perform the selected operations 526. For example, the communication artifact 532 can include a natural language description of the event 516, the selected operations 526, respective degrees of alignment between the selected operations 526 and the primary entity properties 510 (e.g., identifying properties such as risk thresholds, objectives, time horizons, and the like), respective execution risk metrics of the selected operations 526, respective degrees of alignment between the selected operations 526 and compliance standards, respective predicted outcomes of the selected operations 526, and so on. Additionally, or alternatively, the communication artifact 532 can include natural language explanations for relevant information, such as factors influencing an execution risk metric, reasons for determining the degree of alignment between the selected operations 526 and the primary entity properties 510, and so on. Additionally, or alternatively, the communication artifact 532 can include natural language explanations for why certain engagement channels were chosen and/or why a communication session has been initiated (e.g., as opposed to a direct message, email, automatically performing the selected operations 526, and so on). In some implementations, one or more explanations included in the communication artifact 532 are generated by the explainability engine 528.

The application can transmit the communication artifact 532 via the multimodal interface 530 and/or client endpoint 536 to cause presentation of the communication artifact 532 to the primary entity 502. Transmitting the communication artifact 532 can initiate a communication session 534 between the AI agents 514 and the primary entity 502. The communication session 534 can include bi-directional, real-time, and/or multimodal communication between the AI agents 514 and the primary entity 502 via the client endpoint 536 and/or the multimodal interface 530. The communication session 534 can be the same as and/or similar to the communication session 232 described with reference to FIG. 2. In some implementations, the communication artifact 532 is generated and/or presented during an existing communication session 534. For example, an event 516 can be detected during a communication session 534, and the communication artifact 532 can be presented during the communication session 534 (e.g., as an urgent update).

The controller 504 (e.g., AI agents 514) can receive a response, from the primary entity 502 and/or via the client endpoint 536 and/or the multimodal interface 530, associated with the selected operations 526. For example, the response can include a confirmation to perform one or more of the selected operations 526, a rejection of one or more of the selected operations 526, parameters to use with one or more of the selected operations 526 (e.g., an amount of ownership stake to acquire), and/or queries pertaining to the selected operations 526.

The controller 504 (e.g., the AI agents 514) can identify approved operations based on receiving confirmations associated with selected operations 526. The AI agents 514 can determine an execution protocol 540 for performing the approved operations. The execution protocol 540 can be the same as or similar to the execution protocol 342 described with reference to FIG. 3. For example, the execution protocol 540 can specify (e.g., based on contextual data, such as risk factors and/or policy-alignment outputs) automatic execution of the approved operations. Automatic execution can specify an execution mode in which the AI agents 514 perform the approved operations without additional approval or oversight from advisory entities 542. The AI agents 514 can interface with one or more external systems (e.g., via API requests) to execute the approved operations. The AI agents 514 can transmit a confirmation notification to the primary entity 502 via the multimodal interface 530 and/or the client endpoint 536 upon completion of the action (e.g., during the communication session 534).

In some implementations, the AI agents 514 cause presentation of selected operations 526 to an assisting entity 542. For example, the AI agents 514 can receive a response from the primary entity 502 identifying approved operations, and an execution protocol 540 can specify that the approved operations are to be presented to the assisting entity 542. Alternatively, or additionally, the AI agents 514 can determine that the selected operations 526 do not need to be presented to the primary entity 502 for approval, but are to be presented to the assisting entity 542. The assisting entity 542 can be an entity that supervises, approves, and/or executes selected operations (e.g., approved operations). The assisting entity 542 can be the same as, similar to, and/or perform functions of the supervisor entity 344 and/or advisory entity 346 described in reference to FIG. 3. For example, the assisting entity 542 can be a human individual (e.g., human advisor, human compliance officer) or AI agent configured to review, provide feedback for, authorize, and/or execute selected operations on behalf of the primary entity 502.

In some implementations, the assisting entity 542 receives communication artifacts (e.g., communication artifact 532). The communication artifact can be configured specifically for the assisting entity 542 (e.g., based on preferences and/or capabilities of the assisting entity 542) and can include structured data and/or natural language content. The communication artifact can include multimodal data (e.g., text, audio, video, and/or image data) and/or can initiate a conversation session with the assisting entity 542. The assisting entity 542 can receive information (e.g., in a communication artifact) pertaining to the event 516, selected operations 526, and/or primary entity 502, such as execution risk metrics, alignments between selected operations 526 and primary entity properties 510 (e.g., degrees of alignment), alignments between selected operations 526 and compliance standards (e.g., degrees of alignment and/or adherences), and the like. In some implementations, the controller 504 initiates a communication session between the assisting entity 542 and the primary entity 502 to allow the assisting entity 542 to provide recommendations, answer questions, and/or receive information necessary for executing selected operations.

Figure 7:
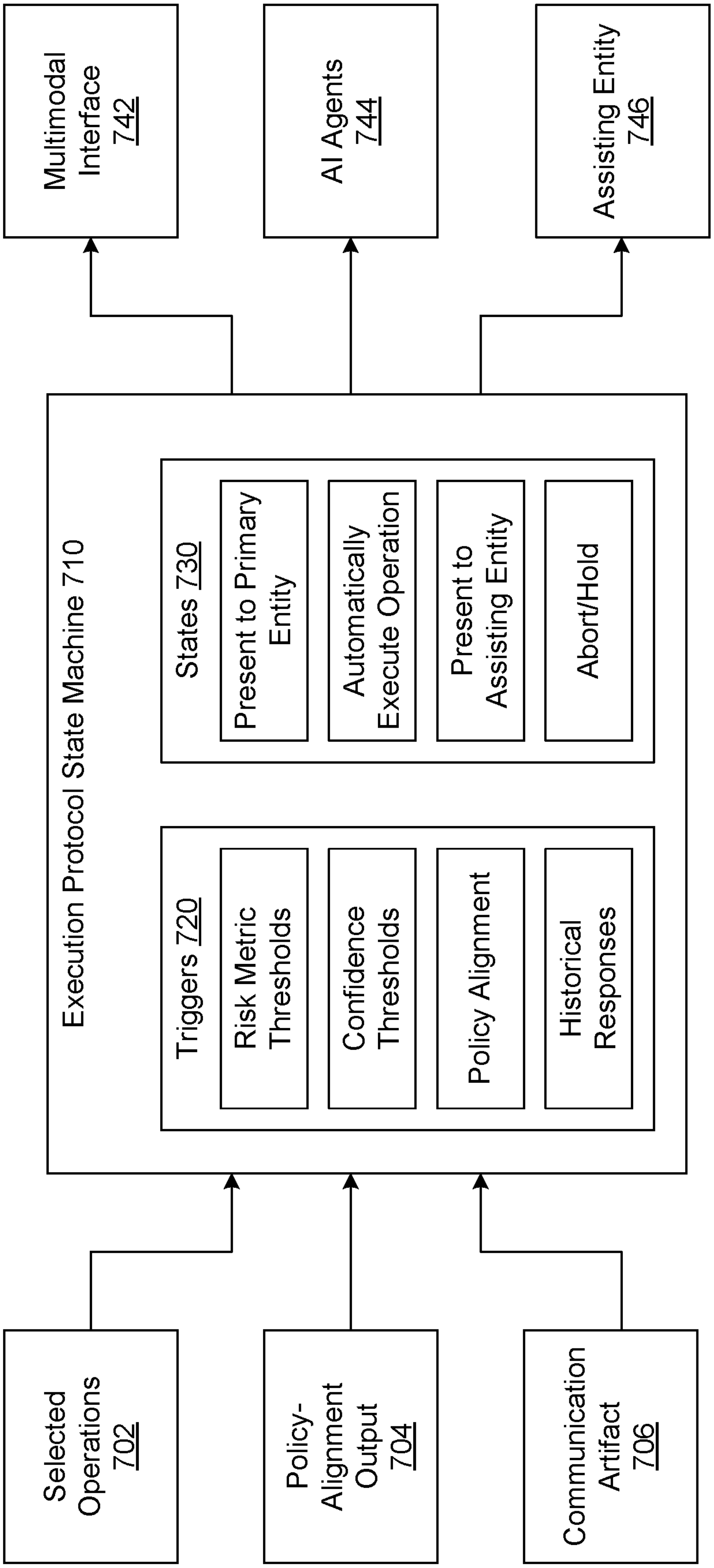
FIG. 7 is an illustration of an execution protocol state machine, in accordance with some implementations of the present technology

FIG. 7 is an illustration of an execution protocol state machine 710, in accordance with some implementations of the present technology. The execution protocol state machine 710 can determine how a selected operation is routed for execution based on evaluation of one or more triggers 720. The execution protocol state machine 710 can be implemented by the controller 504 and/or the AI agents 514 described with reference to FIG. 5. The selected operations 702, policy-alignment output 704, and communication artifact 706 can be the same as or similar to the selected operations 526, policy-alignment outputs 524, and communication artifact 532, respectively, described with reference to FIG. 5. The execution protocol state machine 700 can be implemented using components of the example computer system illustrated and described in more detail with reference to FIG. 12. Likewise, implementations of the execution protocol state machine 700 can include different and/or additional components or can be connected in different ways.

The execution protocol state machine 710 can receive inputs from the selected operations 702, the policy-alignment output 704, and/or the communication artifact 706. The execution protocol state machine 710 can use the triggers 720 to evaluate conditions based on the inputs and determine which of the states 730 to activate for a given operation.

The triggers 720 can include risk metric thresholds, confidence thresholds, policy alignment conditions, and/or historical response patterns. Each trigger 720 can be a condition that, when satisfied, can cause the execution protocol state machine 710 to transition to a different state, and thus cause a different execution protocol. A risk metric threshold trigger can be satisfied when an execution risk metric associated with a selected operation 702 exceeds and/or falls below a predefined threshold value (e.g., a risk metric threshold included in the primary entity properties 510). A confidence threshold trigger can be satisfied when a certainty level associated with a selected operation 702 (e.g., a confidence score generated during identification of the selected operation 702) exceeds and/or falls below a predefined confidence value. A policy alignment trigger can be satisfied when a policy-alignment output 704 indicates a degree of adherence to a policy ruleset that meets and/or fails to meet a predefined alignment condition. A historical response trigger can be satisfied when patterns from prior interactions with the primary entity (e.g., prior confirmations, rejections, and/or modifications of selected operations during previous communication sessions) indicate a predefined behavioral pattern.

Based on the evaluation of the triggers 720, the execution protocol state machine 710 can transition to one of the states 730. The states 730 can include a present to primary entity state, an automatically execute operation state, a present to assisting entity state, and/or an abort/hold state. The present to primary entity state can cause the communication artifact 706 to be routed to the multimodal interface 742 for presentation to the primary entity during a communication session. The automatically execute operation state can cause the selected operations 702 to be routed to the AI agents 744 for autonomous execution without requiring primary entity confirmation. The present to assisting entity state can cause the selected operations 702 and/or the communication artifact 706 to be routed to the assisting entity 746 for review, approval, and/or execution. The abort/hold state can halt execution of the selected operations 702 in response to a policy violation, an execution risk metric exceeding a threshold, and/or a permission state indicating that the operation cannot be performed.

The multimodal interface 742, AI agents 744, and assisting entity 746 can be the same as or similar to the multimodal interface 530, AI agents 514, and assisting entity 542, respectively, described with reference to FIG. 5. The multimodal interface 742 can support multiple modalities for transmitting information to and/or receiving information from the primary entity. The AI agents 744 can correspond to computer-executable operation sets configured to be autonomously executed on respective software application sets. The assisting entity 746 can be a human advisor and/or computer system capable of evaluating, executing, and/or providing recommendations based on the selected operations 702.

In some implementations, the controller 504 receives a response from the primary entity 502 that indicates one or more additional operations. For example, the primary entity 502 can provide a response during the communication session 534 that identifies one or more additional interactions that can be performed between the primary entity 502 and one or more entities, and the additional interactions can correspond to one or more additional operations that can be executed by the AI agents 514. In response, the controller 504 can perform operations similar to operations performed on the available operations and/or potential operations 518. For example, the controller 504 can compare the additional operations to primary entity properties 510 to determine if the additional operations can be performed (e.g., if the primary entity 502 can perform the associated interaction), generate one or more policy-alignment outputs for the additional operations, and determine if one or more of the additional operations are recommended additional operations. The controller 504 can identify an execution protocol 540 for the recommended additional operations, such as automatically executing the recommended additional operations, causing presentation of the recommended additional operations and/or additional information to the primary entity 502 (e.g., an indication that the additional operations can be performed and/or associated execution risk metrics), and/or causing presentation of the recommended additional operations to an assisting entity 542. In some implementations, the controller 504 (e.g., the AI agents 514) can use information gained during the communication session 534 to determine an execution protocol 540. For example, if multiple similar operations are approved by the primary entity 502 during the communication session 534, the controller 504 can decide to automatically execute the recommended additional operations rather than cause presentation of the recommended additional operations and/or additional information about the recommended additional operations.

In some implementations, the controller 504 includes a dedicated provenance module 550 that associates relevant metadata to each event 516. The provenance module 550 can capture and record data source lineage, including data source identifiers (e.g., identifying the data sources 512), retrieval queries used to obtain data from the data sources 512, retrieval timestamps indicating when data was retrieved, a modification timestamp indicating when the received data was most recently updated (e.g., by a controlling entity), confidence scores associated with the retrieved data (e.g., based on source reputation), formats of received data, and/or normalization steps applied to transform raw data into a format usable by the AI agents 514 (e.g., extract, transform, and load (ETL) operations). The provenance module 550 can record associations between the event 516 and relevant information and/or operations that led to the detection of the event, such as model inference steps (e.g., model identifiers and/or model version identifiers), policy evaluation steps (e.g., policy ruleset identifiers and/or versions), and/or artifact generation steps (e.g., artifact identifiers and/or engagement channels). The provenance module can generate a provenance lineage graph that illustrates data flow from the data sources 512 through the processing steps performed by the AI agents 514 to the response signals received from the endpoint 536. The event metadata captured by the provenance module can be used to validate the accuracy of the event based on, for example, accuracy of source data, completeness of data used in processing, and/or operations of the AI agents 514 leading to the detection of the event 516.

In some implementations, the controller 504 (e.g., the AI agents 514 and/or the provenance module 550) generates a trace log 552. The trace log 552 can systematically capture and reference data source lineage, computational reasoning processes, contributing factors for artifact generation, and/or confidence quantification for outcomes. The trace log 552 can be formatted in a structured data schema, including field names and/or identifiers for each of the data entries. The trace log 552 can include data pertaining to the primary entity 502 (e.g., entity identity and/or anonymized entity identifier), event 516, recommendations, and/or communications with the primary entity 502 and/or assisting entity 542. For example, the trace log 552 can include a description (e.g., natural language description) of the event 516, entities associated with the event 516, the potential operations 518, factors leading to the identification of the potential operations 518, the selected operations 526, factors leading to the identification of the selected operations 526, the communication artifact 532, a response to the communication artifact 532, the execution protocol 540, and so on. Factors leading to the identification of the selected operations 526 can include policy-alignment outputs 524, execution risk metrics, degrees of alignment between potential operations 518 and primary entity properties 510, identifications of primary entity properties 510 (e.g., risk threshold, entity preference signals), degrees of alignment between potential operations 518 and compliance standards, identifications of compliance standards (e.g., organizational policies, legal requirements), and so on. Explanation artifacts can be encoded in structured formats suitable for multimodal interaction data-including text, audio, and video-enabling consistent interpretation and review at algorithmic and user interface levels. The dedicated logic engines can compute and store contextual factors that contribute to selected operations 526 and/or confidence levels for predicted results, which can be logged in the trace log 552 alongside recommendation metadata.

In some implementations, the trace log 552 includes data pertaining to the operation of the AI agents 514 in identifying the selected operations 526 and/or the communication artifact 532. In some implementations, the trace log 552 includes identifications of the AI agents 514 used to generate certain outputs. For example, the trace log 552 can identify the AI agents 514 and associated metadata, such as AI model versions, operating parameters (e.g., input, AI model preprompts), compliances (e.g., identifying a compliance set that an AI model is trained to comply with, identifying a compliance set that the AI model is configured to retrieve and use to generate output), AI agent decisions and/or output (e.g., including data transmitted between AI agents), and so on. In some implementations, the trace log 552 identifies used data sources (e.g., data sources 512-1 and/or 512-2) and/or data source metadata (e.g., data lineage). For example, the trace log 552 can identify sources of data, timestamps of when data was retrieved and/or received, timestamps indicating the most recent updates to the data, identifications of data source types (e.g., news report, publication, government announcement, publicly accessible database), and so on. The trace log 552 can indicate contributing factors for the generated recommendations, such as an indication of a reasoning framework used to generate outputs, validation operations performed, degrees of alignment to primary entity properties 510, and so on. The reasoning framework can include a systematic description of operations that are taken by automated systems and/or AI agents 514 to process input data and generate outputs, such as policy-alignment outputs 524 and/or selected operations 526. For example, the reasoning framework can include instructions to generate particular outputs, perform particular validations, and/or execute additional processing based on input characteristics. In some implementations, the trace log 552 includes factors influencing engagement channels used to generate and/or present the communication artifact 532. The trace log 552 can include output from dedicated provenance and explainability components, such as provenance modules, logic engines, and/or an explainability engine.

In some implementations, the trace log 552 can include any information described above with respect to the communication artifact 532 and/or the communication artifact transmitted to an assisting entity 542 (e.g., via an assisting entity endpoint). The information can be in a structured data format and/or a natural language format. In some implementations, the commitment module 554 can redact sensitive data entries (e.g., personal data included in the communication artifact 532, such as primary entity identifiers, detailed operation parameters, and so on) from the trace log 552. The sensitive data entries can be stored in a secure database, and pointers and/or hash commitments over the sensitive data entries are stored in the trace log 552. This separation allows verification of data integrity without exposing sensitive information.

In some implementations, the controller 504 includes a commitment module 554. The commitment module 554 can generate cryptographic commitments over data entries of the trace log 552 to provide tamper-evident verification of stored records. The commitment module 554 can generate a hash pointer for each trace log 552 that includes a cryptographic hash of a previous trace log, thereby forming a hash chain that links trace log entries in sequence and enables detection of any tampering with historical records. Additionally, or alternatively, the commitment module 554 can generate a Merkle tree root that represents a hierarchical hash structure over multiple trace log entries, enabling verification of data integrity across the trace log entries. In some implementations, the commitment module 554 uses hardware security module (HSM)-backed keys for generating cryptographic commitments, providing additional security for the key management associated with ledger commitments. The commitment module 554 can support redaction and/or tokenization strategies for trace logs 552. For example, hashes of sensitive data entries and/or pointers to sensitive data entries can be stored in the trace log 552. The controller 504 can implement access control mechanisms that restrict retrieval of sensitive data entries to authorized entities.

The controller 504 can store the trace log in a trace log database. The trace log database can include one or more forms of tamper-evident and/or immutable storage, such as an append-only log 556. As described in more detail with reference to FIG. 8, the append-only log 556 can include an immutable, distributed, and/or cryptographic ledger, such as a blockchain. The blockchain can be a preexisting distributed ledger (e.g., Ethereum) and/or a locally-hosted and/or controlled blockchain network (e.g., controlled by the controller 504). The append-only log 556 can include an append-only blockchain (e.g., where new entries are logged via transactions to the blockchain) to prevent edits to the logs and provide immutable provenance for the operations of the controller 504. Additionally, or alternatively, the append-only log 556 can include write-once-read-many (WORM) storage, a Merkle tree, and/or another tamper-evident data structure that prevents modification of previously stored entries. The append-only log 556 can use hash pointers to link trace log entries, where each entry includes a cryptographic hash of the previous entry to form a hash chain that enables detection of any tampering with historical records.

In some implementations, the trace log 552 conforms to an audit trail data schema. The audit trail schema can define a structure and format for trace log entries, including required fields, optional fields, data types, and/or relationships between fields. For example, the audit trail schema can require that each trace log entry include a timestamp, an event identifier, a primary entity identifier (e.g., an anonymized identifier), selected operation identifiers, selected operation hash entries (e.g., cryptographic hashes), policy-alignment outputs, execution risk metrics, compliance alignment indicators, execution protocol indicators, and/or an entry signature or hash pointer (e.g., for incorporation into a cryptographic ledger). In some implementations, the audit trail schema conforms to one or more external standards, such as regulatory reporting standards, industry audit standards, and/or data interchange standards. The controller 504 can validate trace log entries against the audit trail schema before storing the trace log entries in the append-only log 556 and/or another trace log database.

The trace log 552 can include deterministic audit records. For example, whenever the controller 504 processes an event 516 and identifies selected operations 526, the controller 504 can generate a trace log entry that includes the fields defined by the audit trail data schema (e.g., timestamp, event identifier, primary entity identifier, selected operation identifiers, policy-alignment outputs, execution risk metrics, execution protocol indicators, and/or cryptographic commitments). The deterministic generation of audit records can ensure that trace log entries are consistently and reliably produced for each operation processed by the controller 504, independent of the probabilistic nature of outputs generated by the AI agents 514. This consistency can enable verification systems (e.g., audit trail verification programs, regulatory reporting systems, and/or assisting entities 542) to reliably retrieve and validate trace log entries for any operation processed by the controller 504. For example, a trace log 552 that complies with an audit trail data schema can reliably be retrieved and/or validated because the trace log entries can be expected to contain the fields defined by the audit trail data schema. The deterministic audit records, combined with the cryptographic commitments generated by the commitment module 554 and the tamper-evident storage of the append-only log 556, can provide a reliable and verifiable record of the operations performed by the controller 504 and/or the AI agents 514.

Figure 8:
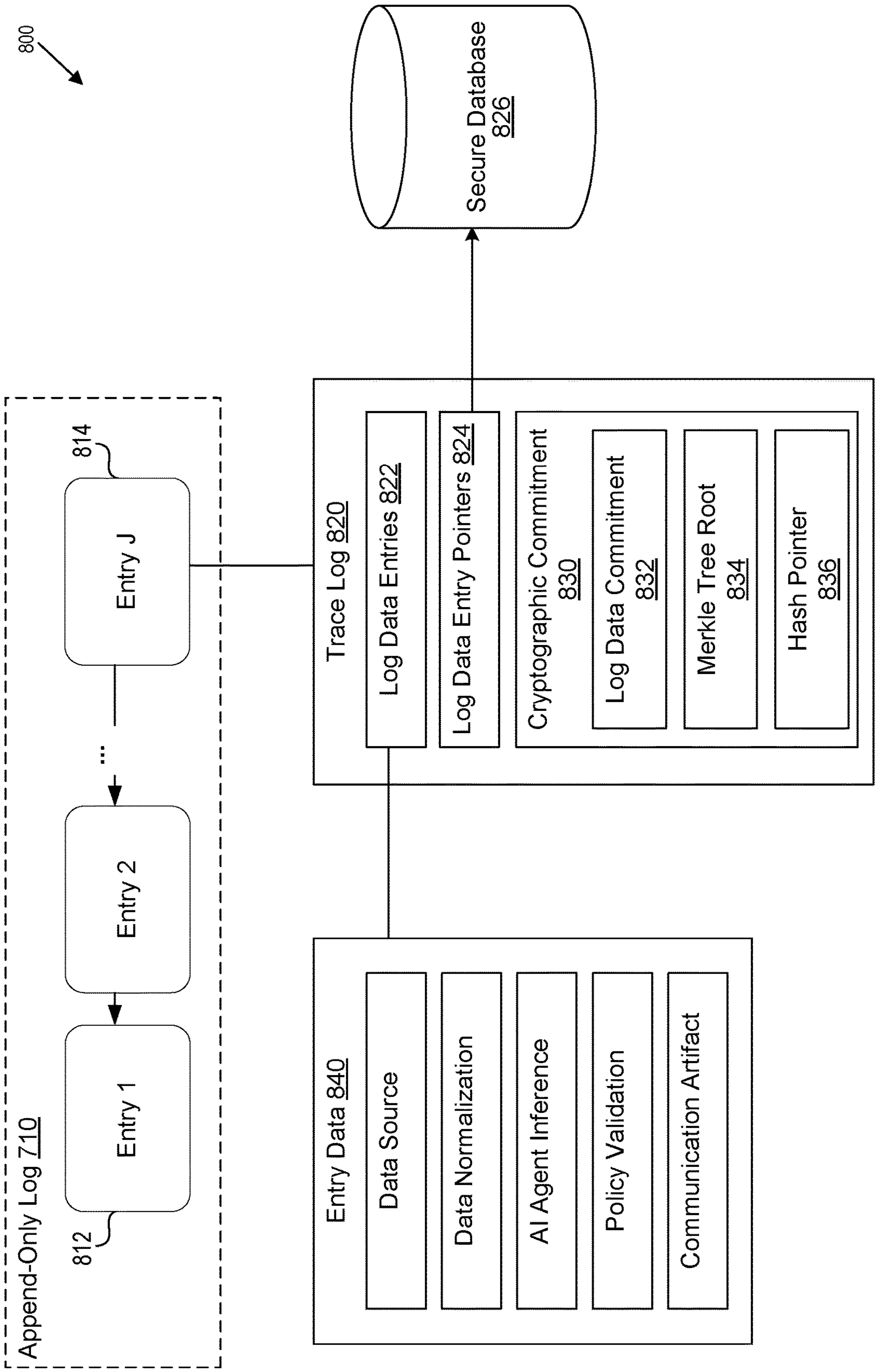
FIG. 8 is an illustration of a secure logging environment including an append-only ledger and associated trace log data structures, in accordance with some implementations of the present technology.

FIG. 8 is an illustration of a secure logging environment 800, including an append-only ledger 810 and associated trace log data structures, in accordance with some implementations of the present technology. The append-only ledger 810 can provide a tamper-evident storage mechanism for trace logs 820 for verification and/or auditing purposes (e.g., to ensure that the trace log 820 maintains provable compliance records for operations performed by AI agents). The trace log 820 can be the same as or similar to the trace log 552 described with reference to FIG. 5. The components and operations described with reference to FIG. 8 can be implemented by the provenance module 550 and/or the commitment module 554. The secure logging environment 800 can be implemented using components of the example computer system illustrated and described in more detail with reference to FIG. 12. Likewise, implementations of the secure logging environment 800 can include different and/or additional components or can be connected in different ways.

The append-only ledger 810 can include a sequence of linked entries, from a first entry 812 to a current entry 814. Each entry in the append-only ledger 810 can be cryptographically linked to preceding entries to form an immutable chain that enables tamper-evident protection of previously stored records. The append-only ledger 810 can include a blockchain, a Merkle log, write-once-read-many (WORM) storage, a transparency log, and/or any other tamper-evident data structure. New entries can be appended to the append-only ledger 810 via transactions (e.g., blockchain transactions), and modifications or deletions of previously stored entries can be detected.

The trace log 820 can capture and organize data associated with operations performed by a communication session signal controller and/or AI agents during generation, transmission, and/or execution of communication artifacts and/or operations. The trace log 820 can include log data entries 822 and log data entry pointers 824. The log data entries 822 can contain structured records associated with the operations of the communication session signal controller and/or AI agents. The log data entry pointers 824 can reference related data and enable navigation between associated records. For example, the log data entry pointers 824 can connect to a secure database 826, which can store sensitive data entries (e.g., primary entity identifiers, detailed operation parameters) that are referenced by the trace log entries without being directly embedded in the append-only ledger 810. This separation can allow sensitive data to be stored in the secure database 826, and hash commitments over the sensitive data can be stored in the append-only ledger 810 for proof of the existence of the sensitive data and/or later validation of the sensitive data. Furthermore, the secure database 826 can implement access restriction measures, such as access control mechanisms and/or encrypted storage of data.

The trace log 820 can incorporate a cryptographic commitment 830 that provides tamper-evident verification of stored data. The cryptographic commitment 830 can be generated by the commitment module 554. The cryptographic commitment 830 can include a log data commitment 832, a Merkle tree root 834, and/or a hash pointer 836. The log data commitment 832 can include a cryptographic hash computed over one or more log data entries 822. The Merkle tree root 834 can represent a hierarchical hash structure that enables verification of data integrity across multiple log entries. The hash pointer 836 can link each trace log entry to a previous entry by including a cryptographic hash of the previous entry, thereby forming a hash chain that enables detection of tampering with historical records.

The log data entries 822 can include entry data 840. The entry data 840 can include data and/or metadata about data used and/or generated by a communication session signal controller. The entry data 840 can include data and/or metadata pertaining to: data sources (e.g., retrieved data, data source identifiers, retrieval queries, retrieval timestamps), data normalization parameters (e.g., identifiers of normalization operations performed), AI agent inference records (e.g., model identifiers, version identifiers, reasoning frameworks used), policy validation results (e.g., policy ruleset identifiers, policy-alignment outputs), communication artifacts (e.g., artifact identifiers, engagement channels, artifact content), execution protocol decisions, and/or primary entity indications (e.g., anonymized identifiers). The entry data 840 can include data and/or metadata of data described with reference to FIGS. 5-7, such as events 516, selected operations 526, policy-alignment outputs 524, execution risk metrics, execution protocols 540, primary entity properties 510, policy rulesets, data source metadata associated with data sources 512, AI agent metadata associated with AI agents 514, communication artifacts 532, and/or response signals received during communication sessions 534. The entry data 840 can include any data described with reference to the provenance module 550. The entry data 840 can be processed through the cryptographic commitment 830 mechanisms to generate the log data commitment 832 and/or incorporate the data into the Merkle tree root 834 structure.

In some implementations, the controller 504 implements one or more retention policies for the trace log 552. The retention policies can specify a duration for which trace log entries are retained, conditions under which trace log entries are archived and/or deleted, and/or storage locations for trace log entries at different stages of a retention lifecycle. For example, a retention policy can specify that trace log entries are retained in active storage for a first duration (e.g., one year), archived to long-term storage for a second duration (e.g., seven years), and deleted after the second duration. The retention policies can be configured based on regulatory requirements, organizational policies, and/or storage capacity constraints.

In some implementations, the append-only log 556 stores one or more programs as smart contracts. A smart contract can be computer-executable code stored on a blockchain that can be configured to automatically execute in response to certain conditions being satisfied. For example, one or more audit trail verification programs can be stored on the append-only log 556 as one or more smart contracts. In some implementations, instructions for and/or actions taken by the one or more AI agents 514 are stored as smart contracts. For example, identifying the potential operations 518, generating the policy-alignment outputs 524, and/or identifying the selected operations 526 can be performed in response to an execution of a smart contract in response to detecting the event 516. The smart contract can identify one or more AI agents 514 (e.g., AI agents associated with compliances required by the event 516 and/or available operations, such as AI agents configured to comply with one or more compliance standards), identify one or more compliance standards, identify one or more reasoning frameworks, identify one or more definitions for policy-alignment outputs 524, and/or identify one or more prompts that will cause the AI agents 514 to identify the selected operations 526 while adhering to compliance standards. Storing the operations in a smart contract (e.g., in a distributed ledger) provides tamper-evident and/or tamper-proof implementation of compliance adherence and allows verification that data was processed and/or recommendations were identified while adhering to the compliance standards.

The controller 504 can use the trace log 552 and/or the append-only log 556 to provide immutable provenance records for the decisions made by the controller 504, the operations recommended by the controller 504, and/or the operations executed by the controller 504. For example, the controller 504 can be configured to generate a compliance report detailing an alignment between recommended and/or executed operations and compliance standards. In some implementations, the controller 504 implements one or more audit trail verification programs. The audit trail verification program can perform proof verification for the event 516, communication artifact 532, communication session 534, and/or selected operations 526. For example, a selected operation can be identified (e.g., by the primary entity 502 during a communication session 534) and the audit trail verification program can verify the selected operation, execution risk metrics of the selected operation, and/or a degree of alignment between the selected operation and a set of compliance standards (e.g., an adherence to the compliance standards). The audit trail verification program can generate a compliance report that details an adherence between selected operations and compliance standards. The compliance report can be stored for later review, presented to the primary entity 502 (e.g., as a communication artifact presented during a communication session), and/or transmitted to a third party (e.g., to comply with regulatory reporting standards).

In some implementations, a compliance report includes explanations in one or more explainability formats. The explainability formats can include a natural language format, a visual format, and/or a structured data format. The natural language format can include human-readable descriptions in one or more modalities (e.g., text, audio, and/or video). The visual format can include charts, graphs, diagrams, and/or other visual representations of information. For example, the visual format can include a bar chart comparing policy-alignment outputs 524 across multiple potential operations 518, a pie chart illustrating a composition of risk factors, a table illustrating the most relevant compliance standards, and/or a timeline illustrating events and/or factors affecting the decisions made by the controller 504. Additionally, or alternatively, the visual format can include color-coded indicators (e.g., green, yellow, red) representing risk levels, compliance status, and/or alignments with primary entity properties 510. The structured data format can include machine-readable data representations such as tables, key-value pairs, and/or hierarchical data structures. For example, the structured data format can include a table listing each selected operation 526 alongside corresponding policy-alignment outputs 524, execution risk metrics, and/or compliance alignment scores. The AI agents 514 can identify an explainability format based on engagement signals of the primary entity properties 510 indicating a preferred format, properties of the event 516 (e.g., complexity, urgency), properties of the selected operations 526, and/or an intent of the compliance report (e.g., presentation to the primary entity 502, storage for later use, submission to regulatory reporting system).

In some implementations, the controller 504 integrates with one or more regulatory reporting systems. The regulatory reporting systems can include systems operated by regulatory agencies, industry self-regulatory organizations, and/or third-party compliance service providers. The controller 504 can transmit compliance reports, trace log entries, and/or other audit information to the regulatory reporting systems via one or more data transmission protocols, such as secure file transfer protocol (SFTP), secure APIs, and/or message queue systems. For example, the controller 504 can transmit a compliance report to a regulatory reporting system in response to a reporting deadline, a regulatory inquiry, and/or a detected compliance event. In some implementations, the controller 504 generates regulatory reports in one or more formats specified by the regulatory reporting systems. The formats can include extensible markup language (XML), JavaScript object notation (JSON), comma-separated values (CSV), and/or proprietary formats defined by the regulatory reporting systems. The controller 504 can transform trace log entries and/or compliance reports into the specified formats before transmission to the regulatory reporting systems. In some implementations, the controller 504 receives acknowledgments, validation results, and/or feedback from the regulatory reporting systems. For example, the controller 504 can receive an acknowledgment indicating that a compliance report was received and validated by a regulatory reporting system, and/or the controller 504 can receive feedback indicating that a compliance report requires correction and/or additional information. The controller 504 can store the acknowledgments, validation results, and/or feedback in a trace log and/or the append-only log 556 to provide a record of regulatory reporting activities.

It is contemplated that the descriptions and/or operations of FIG. 5 may be used with any other implementation of this disclosure. In addition, the descriptions and/or operations described in relation to FIG. 5 may be done in alternative orders, in parallel, or multiple times to further the purposes of this disclosure. For example, each of these operations may be performed in any order, in parallel, or simultaneously to reduce latency or increase the speed of a system or process. Furthermore, it should be noted that any of the devices or equipment discussed in relation to the other figures or otherwise disclosed herein could be used to perform one or more of the operations in FIG. 5.

Example Method Flow for Artifact Execution and Provenance

Figure 9:
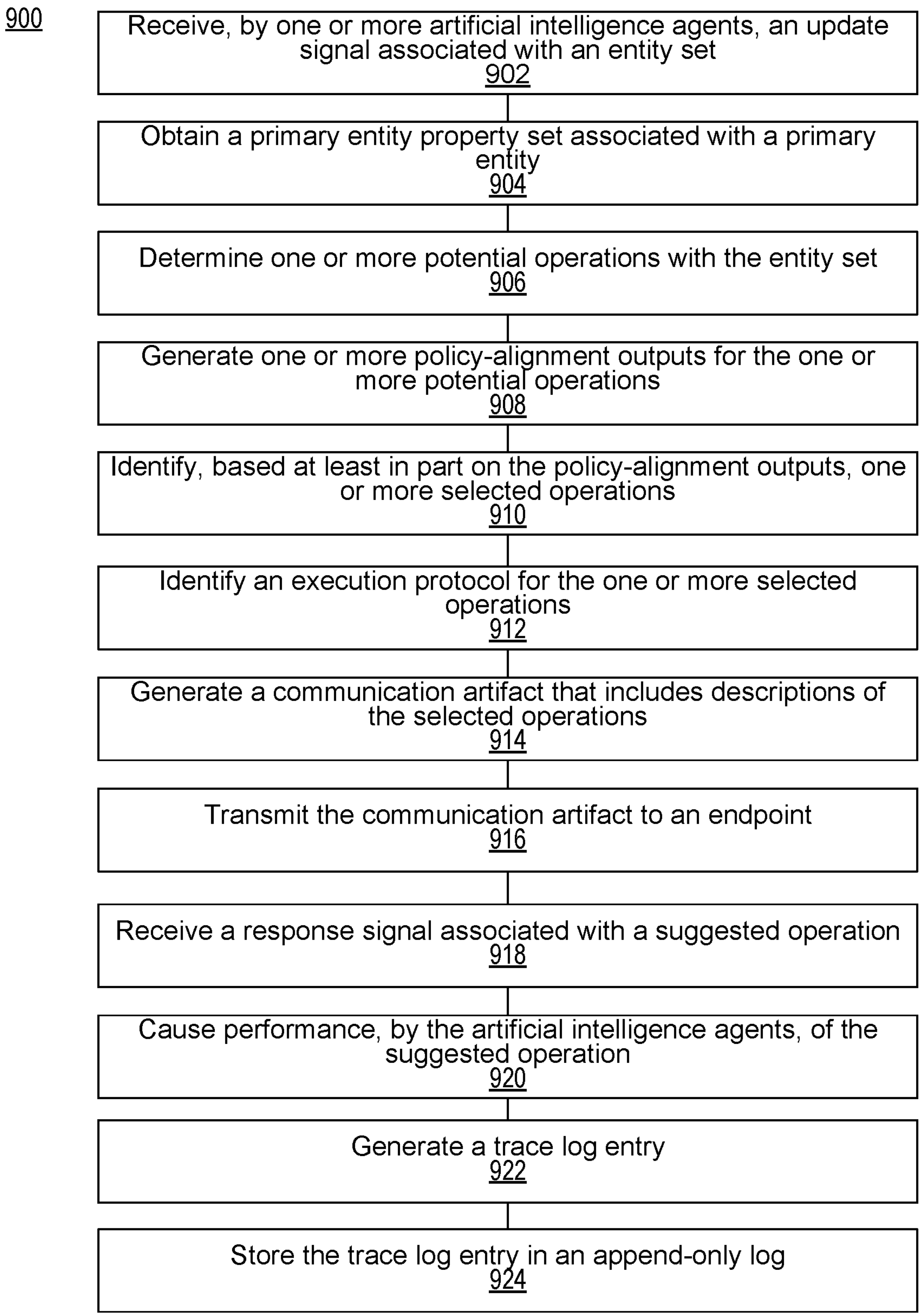
FIG. 9 is a flow diagram illustrating an example method for communicating and executing recommended operations to a primary entity while enforcing compliance, auditability, and explainability, in accordance with some implementations of the present technology.

FIG. 9 is a flow diagram illustrating an example method 900 for communicating and executing selected operations to a primary entity while enforcing compliance, auditability, and explainability, in accordance with some implementations of the present technology. The method 900 can be implemented using components of the example computer system illustrated and described in more detail with reference to FIG. 12.

The method 900 can be performed by a communication session signal controller capable of receiving external update signals and interacting with a primary entity via an endpoint. The update signals can include information pertaining to events associated with at least one entity. The communication session signal controller can be coupled to and/or include one or more autonomous artificial intelligence (AI) systems. The autonomous AI systems can include one or more AI agents, and can each correspond to a respective computer-executable operation set configured to be autonomously executed by the respective autonomous AI system on a respective software application set. The communication session signal controller can be capable of initiating and/or maintaining a communication session with the primary entity. The communication session signal controller can be communicably coupled to an endpoint (e.g., edge application) and/or multimodal interface configured to present communication data of a multimodal communication session. The endpoint can be configured to cause presentation of an avatar using multimodal communication data received from the communication session signal controller.

At operation 902, the communication session signal controller can receive an update signal associated with an entity set (e.g., at least one entity). The entity set can include a public entity and/or the primary entity can hold an ownership stake in the entity set. The entity set can be associated with one or more available operations between the one or more autonomous AI systems and the entity set. The update signal can include and/or be used to infer an event associated with the entity set.

At operation 904, the communication session signal controller can obtain a primary entity property set. The primary entity property set can include properties associated with the primary entity. The primary entity property set can be obtained from a primary entity property repository that can be accessed by the communication session signal controller and/or is included in the communication session signal controller.

At operation 906, the communication session signal controller can determine (e.g., using the autonomous AI systems) one or more potential operations with the entity set. The potential operations can correspond to available operations that are available to be performed by the autonomous AI systems on behalf of the primary entity. The communication session signal controller can use (at least in part) the primary entity property set to identify potential operations. For example, the communication session signal controller can filter, based at least in part on the primary entity property set, the one or more available operations to identify one or more potential operations with the entity set.

At operation 908, the communication session signal controller can generate one or more policy-alignment outputs. Each policy-alignment output can be associated with a potential operation, and can characterize a suitability of the potential operation based on an alignment with the primary entity property set and/or an adherence to a respective policy ruleset. For example, each policy-alignment output can characterize a degree of alignment between a respective potential operation and the primary entity property set and/or a degree of adherence between the respective potential operation and the respective policy ruleset. In some implementations, a policy-alignment output is generated based at least in part on the primary entity property set, an execution risk metric of the respective potential operation, and/or a respective policy ruleset.

At operation 910, the communication session signal controller can identify one or more selected operations of the one or more potential operations. The one or more selected operations can be identified based at least in part on policy-alignment outputs for the one or more potential operations.

At operation 912, the communication session signal controller can identify an execution protocol. For example, the communication session signal controller can determine that the communication session signal controller will cause performance of a selected operation without informing the primary entity (e.g., automatically cause performance of a selected operation and/or cause presentation of a selected operation to an assisting entity), or inform the primary entity of the selected operation during a multimodal communication session between the primary entity and the one or more artificial intelligence agents (e.g., and prompt the primary entity for a confirmation to cause performance of the selected operation). The communication session signal controller can determine separate execution protocols for each of the one or more selected operations, and/or determine a single execution protocol for the one or more selected operations.

At operation 914, the communication session signal controller can generate a communication artifact (e.g., when the identified execution protocol includes informing the primary entity of the one or more selected operations). The communication artifact can be a multimodal communication artifact, and/or can include at least two of text, audio data, image data, and/or video data. The communication artifact can include a description of the update signal (e.g., an event), the one or more selected operations, a degree of alignment between the one or more selected operations and at least one primary entity property.

At operation 916, the communication session signal controller can transmit the communication artifact. The communication artifact can be part of a communication session between the primary entity and the autonomous AI systems. For example, transmitting the communication artifact can cause an initiation of a communication session between the primary entity and the one or more autonomous artificial intelligence systems via the endpoint. This can cause, for example, the primary entity to receive an alert or notification (e.g., via an endpoint) that, when interacted with, causes presentation of the communication artifact to the primary entity and/or establishes a communication session.

At operation 918, the communication session signal controller can receive a response signal associated with the selected operation. For example, the communication session signal controller can receive the response signal via the endpoint and/or during the communication session. The response signal can indicate a confirmation to cause performance of at least one of the one or more selected operations. The response signal can include multimodal communication information, such as text data, audio data, and/or video data.

At operation 920, the communication session signal controller can cause performance, by the one or more autonomous artificial intelligence systems, of a selected operation. For example, the communication session signal controller can cause performance of selected operations that were confirmed and/or approved by the primary entity.

At operation 922, the communication session signal controller can generate a trace log entry. The trace log entry can include an execution risk metric of a selected operation, a degree of alignment between a selected operation and a policy ruleset, or a degree of alignment between the selected operation and the primary entity property set.

At operation 924, the communication session signal controller can store the trace log entry. The trace log entry can be stored in an append-only, immutable, cryptographic, and/or distributed ledger. For example, the trace log entry can be stored on a blockchain (e.g., an append-only blockchain) as part of a blockchain transaction. The trace log entry can include one or more trace log data entries, such as: an indication of the update signal and/or event, an indication of the primary entity (e.g., an identity and/or anonymized identifier), an indication of the selected operations, a policy ruleset (e.g., used to determine the selected operations), a policy-alignment output, an indication of an execution risk metric, an indication of a risk assessment framework (e.g., used to determine the selected operations), an indication (e.g., identifier) of a data source (e.g., a data source used to receive the update signal and/or detect an occurrence of an event), an indication of an autonomous artificial intelligence system, a pointer to related data, a cryptographic commitment (e.g., a hash of one or more trace log data entries, a hash of related data referenced by the trace log entry but not included in the trace log entry, a hash pointer to a previous trace log entry), and so on.

In some implementations, the communication session signal controller can receive an indication of an additional operation. For example, the communication signal controller can receive, in the response signal associated with the selected operation, the indication of one or more additional operations. The communication session signal controller can responsively perform one or more of the operations described above with respect to the one or more potential operations and/or the one or more selected operations. For example, the communication session signal controller can generate one or more policy-alignment outputs for the one or more additional operations, identify one or more selected additional operations (e.g., based determinations of whether the one or more additional operations are possible and/or based on relative policy-alignment outputs), generate a subsequent communication artifact, and transmit the subsequent communication artifact (e.g., to an endpoint for presentation to a primary user during the communication session). The communication session signal controller can additionally receive a subsequent response signal indicating a confirmation to cause performance of at least one of the selected additional operations, and cause performance of the selected additional operations using the autonomous AI systems. In some implementations, the communication session signal controller receives, after transmitting the communication artifact, a response signal that does not indicate confirmation of any of the selected operations, and instead indicates the one or more additional operations.

In some implementations, the communication session signal controller causes presentation of one or more selected operations to an assisting entity. The assisting entity can be a human advisor and/or computer system (e.g., one or more AI agents) capable of evaluating, executing, and/or giving recommendations based on the one or more selected operations. For example, the communication session signal controller can identify an execution protocol that includes causing performance of the selected operation without informing the primary entity, and subsequently generate a subsequent communication artifact for the assisting entity. Additionally, or alternatively, the communication session signal controller can receive a response associated with a selected operation (e.g., received from the primary entity) indicating a confirmation to cause performance of the selected operation, and subsequently generate a subsequent communication artifact that includes the selected operation and transmit the subsequent communication artifact to the assisting entity (e.g., to an assisting entity endpoint for presentation to the assisting entity). Additionally, or alternatively, the communication session signal controller can receive a response signal from the primary entity that indicates an additional operation, and can subsequently generate a subsequent communication artifact that includes the additional operation and transmit the subsequent communication artifact to the assisting entity. The subsequent communication artifact can include text, audio, video, and/or image data. The subsequent communication artifact can include multimodal communication information and/or be part of a multimodal communication session between the assisting entity and the autonomous AI systems (e.g., a communication session initiated by the transmission of the subsequent communication artifact to the assisting entity and/or a communication session presented via an endpoint).

It is contemplated that the operations or descriptions of FIG. 9 may be used with any other implementation of this disclosure. In addition, the operations and descriptions described in relation to FIG. 9 may be done in alternative orders, in parallel, or multiple times to further the purposes of this disclosure. For example, each of these operations may be performed in any order, in parallel, or simultaneously to reduce latency or increase the speed of the system or method. Furthermore, it should be noted that any of the devices or equipment discussed in relation to the other figures or otherwise disclosed herein could be used to perform one or more of the operations in FIG. 9.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term "DNN" may encompass any neural network having multiple layers, including graph neural networks (GNNs), convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), may represent a subject domain (e.g., scientific papers), and/or may encompass another domain or domains, be they larger or smaller than a single language or subject domain. For example, a relatively large, multilingual, and non-subject-specific corpus may be created by extracting text from online web pages and/or publicly available social media posts. Training data may be annotated with ground truth labels (e.g., each data entry in the training dataset may be paired with a label) or may be unlabeled.

As another example, to train an ML model that is intended to generate images, the training dataset may be a dataset of image-text pairs. The dataset represents a text domain (e.g., a caption corresponding to the image), a language domain (e.g., the language the caption is written in), and/or encompasses another domain or domains, be they larger or smaller than a single text or language domain. For example, a relatively large and non-subject-specific dataset may be created by extracting images from online web pages and/or publicly available social media posts and associating text captions with those images.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder) or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger dataset. For example, a dataset may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger dataset and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses large language models (LLMs).

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of an LLM may contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

Additionally or alternatively, language models may be embedded into other ML models, such as a diffusion model (e.g., Stable Diffusion, DaLL-E, Midjourney), that are trained to generate images based on processing of a natural language input performed by the language models. For example, the language model may process the natural language input into a guidance vector containing information regarding the type of image to be generated. The diffusion model may then receive an input tensor, which is typically an image of randomly generated noise. Through a process of denoising, noise is gradually removed from the input tensor in a manner specified by the guidance vector. The denoising process continues until the resulting image resembles the type of image specified by the natural language input. The diffusion model may then provide the resulting image as output.

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. Although transformer-based language models are described herein, it should be understood that the present disclosure may be applicable to any ML-based model, including language models based on other neural network architectures such as RNN-based language models.

Figure 10:
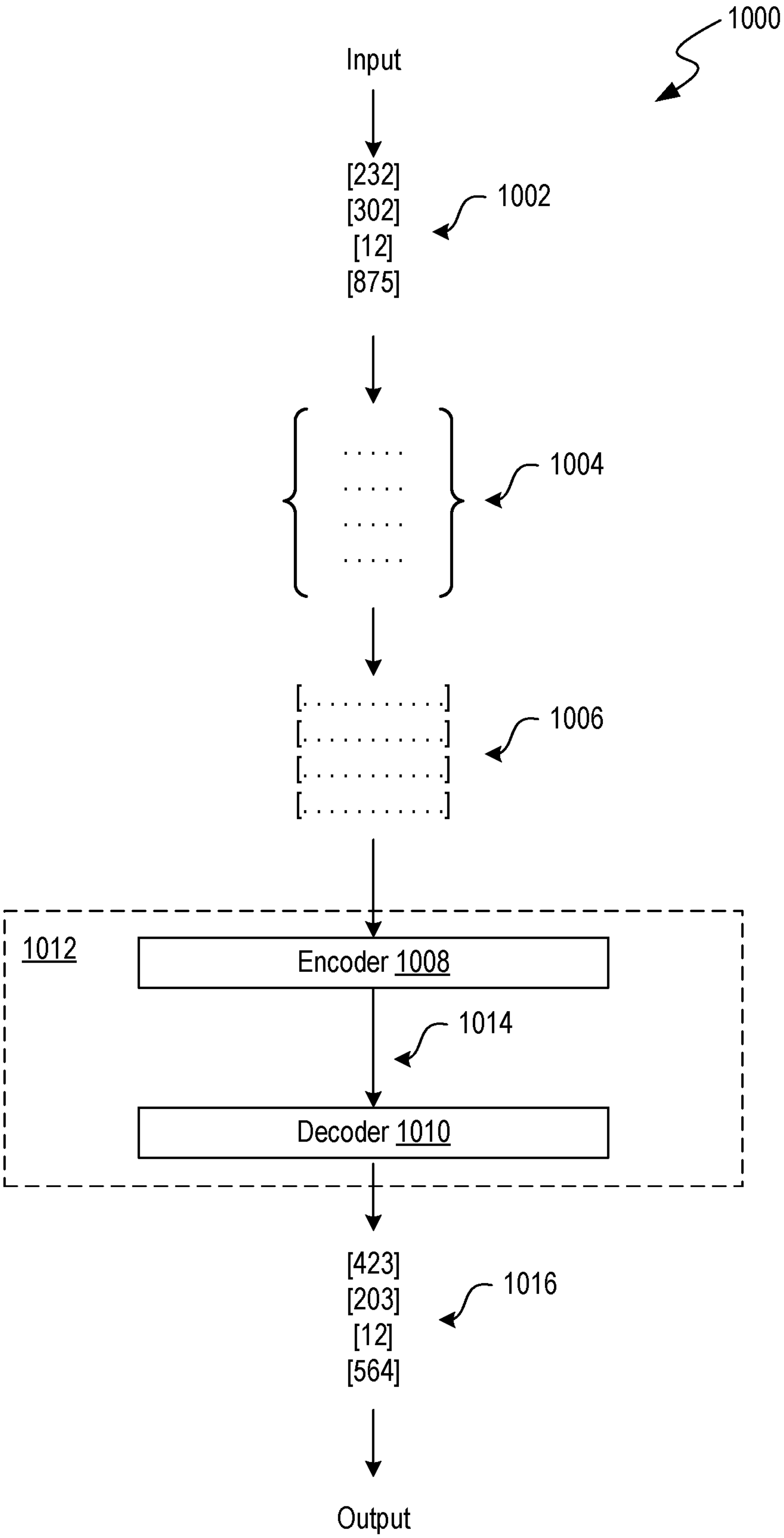
FIG. 10 is a block diagram of an example transformer.

FIG. 10 is a block diagram 1000 of an example transformer 1012. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence.

The transformer 1012 includes an encoder 1008 (which can comprise one or more encoder layers/blocks connected in series) and a decoder 1010 (which can comprise one or more decoder layers/blocks connected in series). Generally, the encoder 1008 and the decoder 1010 each include a plurality of neural network layers, at least one of which can be a self-attention layer. The parameters of the neural network layers can be referred to as the parameters of the language model.

The transformer 1012 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 1012 is trained to perform certain functions on other input formats than natural language input. For example, the input can include objects, images, audio content, or video content, or a combination thereof.

The transformer 1012 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input, generating images based on natural language inputs). FIG. 10 illustrates an example of how the transformer 1012 can process textual input data. Input to a language model (whether transformer-based or otherwise) typically is in the form of natural language that can be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 10, a short sequence of tokens 1002 corresponding to the input text is illustrated as input to the transformer 1012. Tokenization of the text sequence into the tokens 1002 can be performed by some pre-processing tokenization module such as, for example, a byte-pair encoding tokenizer (the "pre" referring to the tokenization occurring prior to the processing of the tokenized input by the LLM), which is not shown in FIG. 10 for simplicity. In general, the token sequence that is inputted to the transformer 1012 can be of any length up to a maximum length defined based on the dimensions of the transformer 1012. Each token 1002 in the token sequence is converted into an embedding vector 1006 (also referred to simply as an embedding 1006). An embedding 1006 is a learned numerical representation (such as, for example, a vector) of a token that captures some semantic meaning of the text segment represented by the token 1002. The embedding 1006 represents the text segment corresponding to the token 1002 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 1006 corresponding to the "write" token will be closer to another embedding corresponding to the "jot down" token in the vector space as compared to the distance between the embedding 1006 corresponding to the "write" token and another embedding corresponding to the "summary" token.

The vector space can be defined by the dimensions and values of the embedding vectors. Various techniques can be used to convert a token 1002 to an embedding 1006. For example, another trained ML model can be used to convert the token 1002 into an embedding 1006. In particular, another trained ML model can be used to convert the token 1002 into an embedding 1006 in a way that encodes additional information into the embedding 1006 (e.g., a trained ML model can encode positional information about the position of the token 1002 in the text sequence into the embedding 1006). In some examples, the numerical value of the token 1002 can be used to look up the corresponding embedding in an embedding matrix 1004 (which can be learned during training of the transformer 1012).

The generated embeddings 1006 are input into the encoder 1008. The encoder 1008 serves to encode the embeddings 1006 into feature vectors 1014 that represent the latent features of the embeddings 1006. The encoder 1008 can encode positional information (i.e., information about the sequence of the input) in the feature vectors 1014. The feature vectors 1014 can have very high dimensionality (e.g., on the order of thousands or tens of thousands), with each element in a feature vector 1014 corresponding to a respective feature. The numerical weight of each element in a feature vector 1014 represents the importance of the corresponding feature. The space of all possible feature vectors 1014 that can be generated by the encoder 1008 can be referred to as the latent space or feature space.

Conceptually, the decoder 1010 is designed to map the features represented by the feature vectors 1014 into meaningful output, which can depend on the task that was assigned to the transformer 1012. For example, if the transformer 1012 is used for a translation task, the decoder 1010 can map the feature vectors 1014 into text output in a target language different from the language of the original tokens 1002. Generally, in a generative language model, the decoder 1010 serves to decode the feature vectors 1014 into a sequence of tokens. The decoder 1010 can generate output tokens 1016 one by one. Each output token 1016 can be fed back as input to the decoder 1010 in order to generate the next output token 1016. By feeding back the generated output and applying self-attention, the decoder 1010 is able to generate a sequence of output tokens 1016 that has sequential meaning (e.g., the resulting output text sequence is understandable as a sentence and obeys grammatical rules). The decoder 1010 can generate output tokens 1016 until a special [EOT] token (indicating the end of the text) is generated. The resulting sequence of output tokens 1016 can then be converted to a text sequence in post-processing. For example, each output token 1016 can be an integer number that corresponds to a vocabulary index. By looking up the text segment using the vocabulary index, the text segment corresponding to each output token 1016 can be retrieved, the text segments can be concatenated together, and the final output text sequence can be obtained.

In some examples, the input provided to the transformer 1012 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an application programming interface (API)). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Artificial Intelligence System

Figure 11:
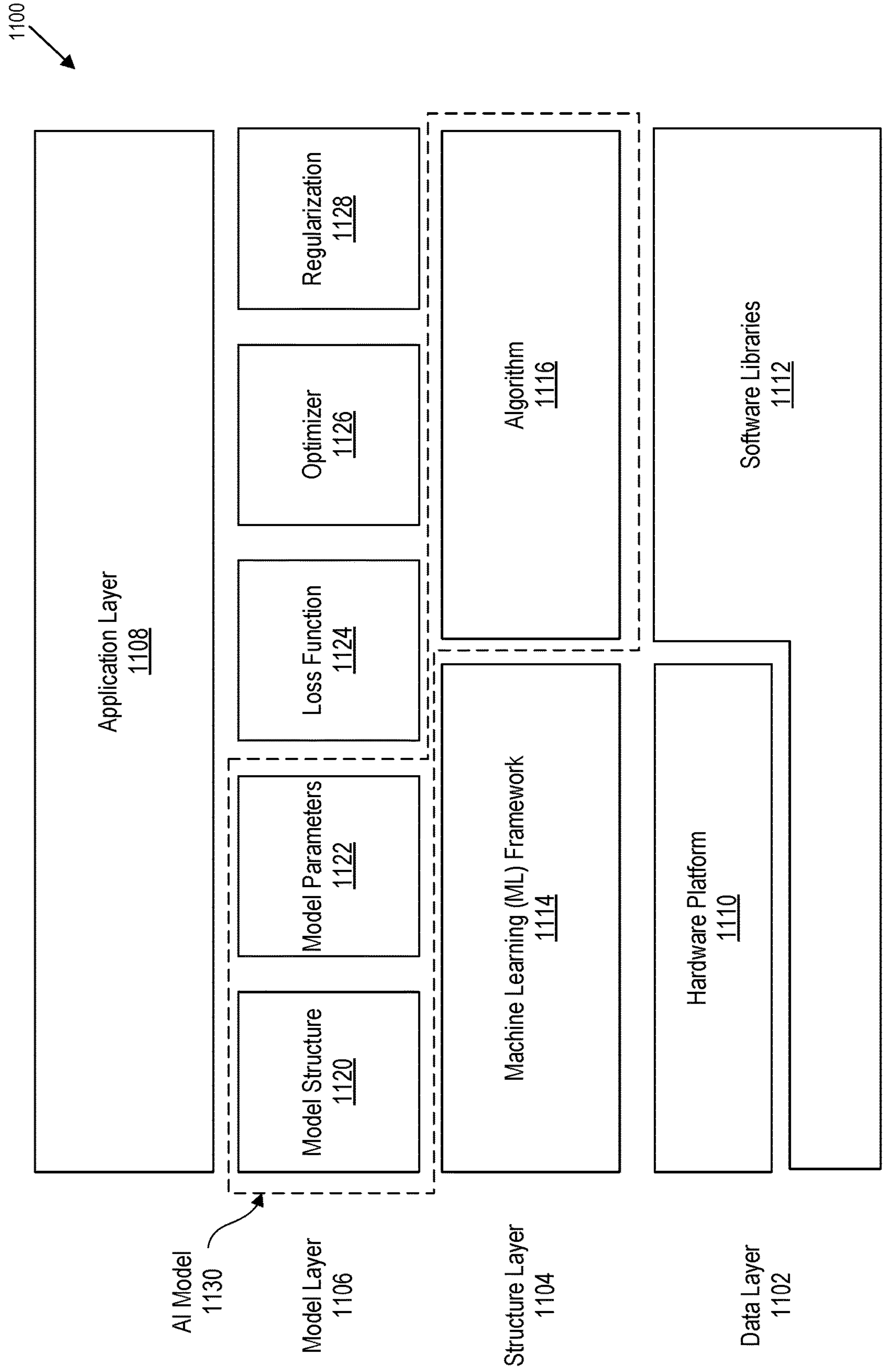
FIG. 11 is a block diagram that illustrates an example of an AI system in which at least some operations described herein can be implemented.

FIG. 11 is a block diagram that illustrates an example of an AI system 1100 in which at least some operations described herein can be implemented. Example ML models can include one or models executed by the AI agent 114, the AI agent 214, and/or the AI agent 314 described, respectively, in FIGS. 1-3. Accordingly, the AI agent 114, the AI agent 214, and/or the AI agent 314 can include one or more components of the AI system 1100.

As shown in FIG. 11, the AI system 1100 can include a set of layers, which conceptually organize elements within an example network topology for the AI system's architecture to implement a particular AI model 1130. Generally, an AI model 1130 is a computer-executable program implemented by the AI system 1100 that analyzes data to make predictions. Information can pass through each layer of the AI system 1100 to generate outputs for the AI model 1130. The layers can include a data layer 1102, a structure layer 1104, a model layer 1106, and an application layer 1108. The algorithm 1116 of the structure layer 1104 and the model structure 1120 and model parameters 1122 of the model layer 1106 together form the example AI model 1130. The optimizer 1126, loss function engine 1124, and regularization engine 1128 work to refine and optimize the AI model 1130, and the data layer 1102 provides resources and support for application of the AI model 1130 by the application layer 1108.

The data layer 1102 acts as the foundation of the AI system 1100 by preparing data for the AI model 1130. As shown, the data layer 1102 can include two sub-layers: a hardware platform 1110 and one or more software libraries 1112. The hardware platform 1110 can be designed to perform operations for the AI model 1130 and include computing resources for storage, memory, logic, and networking. The hardware platform 1110 can process amounts of data using one or more servers. The servers can perform backend operations such as matrix calculations, parallel calculations, ML training, and the like. Examples of servers used by the hardware platform 1110 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1110 can include Infrastructure as a Service (IaaS) resources, which are computing resources (e.g., servers, memory, etc.) offered by a cloud services provider. The hardware platform 1110 can also include computer memory for storing data about the AI model 1130, application of the AI model 1130, and training data for the AI model 1130. The computer memory can be a form of random-access memory (RAM), such as dynamic RAM, static RAM, and non-volatile RAM.

The software libraries 1112 can be thought of as suites of data and programming code, including executables, used to control the computing resources of the hardware platform 1110. The programming code can include low-level primitives (e.g., fundamental language elements) that form the foundation of one or more low-level programming languages such that servers of the hardware platform 1110 can use the low-level primitives to carry out specific operations. The low-level programming languages do not require much, if any, abstraction from a computing resource's instruction set architecture, allowing them to run quickly with a small memory footprint. Examples of software libraries 1112 that can be included in the AI system 1100 include Intel Math Kernel Library, Nvidia cuDNN, Eigen, and OpenBLAS.

The structure layer 1104 can include an ML framework 1114 and an algorithm 1116. The ML framework 1114 can be thought of as an interface, library, or tool that allows users to build and deploy the AI model 1130. The ML framework 1114 can include an open-source library, an API, a gradient-boosting library, an ensemble method, and/or a deep learning toolkit that work with the layers of the AI system to facilitate development of the AI model 1130. For example, the ML framework 1114 can distribute processes for application or training of the AI model 1130 across multiple resources in the hardware platform 1110. The ML framework 1114 can also include a set of pre-built components that have the functionality to implement and train the AI model 1130 and allow users to use pre-built functions and classes to construct and train the AI model 1130. Thus, the ML framework 1114 can be used to facilitate data engineering, development, hyperparameter tuning, testing, and training for the AI model 1130. Examples of ML frameworks 1114 that can be used in the AI system 1100 include TensorFlow, PyTorch, Scikit-Learn, Keras, Caffe, LightGBM, Random Forest, and Amazon Web Services.

The algorithm 1116 can be an organized set of computer-executable operations used to generate output data from a set of input data and can be described using pseudocode. The algorithm 1116 can include complex code that allows the computing resources to learn from new input data and create new/modified outputs based on what was learned. In some implementations, the algorithm 1116 can build the AI model

1130 through being trained while running computing resources of the hardware platform 1110. This training allows the algorithm 1116 to make predictions or decisions without being explicitly programmed to do so. Once trained, the algorithm 1116 can run at the computing resources as part of the AI model 1130 to make predictions or decisions, improve computing resource performance, or perform tasks. The algorithm 1116 can be trained using supervised learning, unsupervised learning, semi-supervised learning, and/or reinforcement learning.

Using supervised learning, the algorithm 1116 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include asset tracking histories with known threat levels, resources with known relevancy scores measuring their relevance to known assets, and logs of physical and digital features with known correspondences and similarities. The user may label the training data based on one or more classes and train the AI model 1130 by inputting the training data to the algorithm 1116. The algorithm determines how to label the new data based on the labeled training data. The user can facilitate collection, labeling, and/or input via the ML framework 1114. In some instances, the user may convert the training data to a set of feature vectors for input to the algorithm 1116. Once trained, the user can test the algorithm 1116 on new data to determine if the algorithm 1116 is predicting accurate labels for the new data. For example, the user can use cross-validation methods to test the accuracy of the algorithm 1116 and retrain the algorithm 1116 on new training data if the results of the cross-validation are below an accuracy threshold.

Supervised learning can involve classification and/or regression. Classification techniques involve teaching the algorithm 1116 to identify a category of new observations based on training data and are used when input data for the algorithm 1116 is discrete. Said differently, when learning through classification techniques, the algorithm 1116 receives training data labeled with categories (e.g., classes) and determines how features observed in the training data (e.g., service name, asset room location, asset internet protocol (IP) address) relate to the categories (e.g., high risk or low risk of cybersecurity attack). Once trained, the algorithm 1116 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1116 is continuous. Regression techniques can be used to train the algorithm 1116 to predict or forecast relationships between variables. To train the algorithm 1116 using regression techniques, a user can select a regression method for estimating the parameters of the model. The user collects and labels training data that is input to the algorithm 1116 such that the algorithm 1116 is trained to understand the relationship between data features and the dependent variable(s). Once trained, the algorithm 1116 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for ML-based pre-processing operations.

Under unsupervised learning, the algorithm 1116 learns patterns from unlabeled training data. In particular, the algorithm 1116 is trained to learn hidden patterns and insights of input data, which can be used for data exploration or for generating new data. Here, the algorithm 1116 does not have a predefined output, unlike the labels output when the algorithm 1116 is trained using supervised learning. Said another way, unsupervised learning is used to train the algorithm 1116 to find an underlying structure of a set of data, group the data according to similarities, and represent that set of data in a compressed format. In some implementations, performance of the algorithm 1116 that can use unsupervised learning is improved because it can learn how to fine-tune the model by setting an ideal cutoff score for relevancy rank, as described herein.

A few techniques can be used in unsupervised learning: clustering, anomaly detection, and techniques for learning latent variable models. Clustering techniques involve grouping data into different clusters that include similar data such that other clusters contain dissimilar data. For example, during clustering, data with possible similarities remain in a group that has less or no similarities to another group. Examples of clustering techniques include density-based methods, hierarchical-based methods, partitioning methods, and grid-based methods. In one example, the algorithm 1116 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1116 may be trained to be an Isolation Forest, local outlier factor (LOF) algorithm, or k-NN algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 1116 include factor analysis, item response theory, latent profile analysis, and latent class analysis.

The model layer 1106 implements the AI model 1130 using data from the data layer 1102 and the algorithm 1116 and ML framework 1114 from the structure layer 1104, thus enabling decision-making capabilities of the AI system 1100. The model layer 1106 includes a model structure 1120, model parameters 1122, a loss function engine 1124, an optimizer 1126, and a regularization engine 1128.

The model structure 1120 describes the architecture of the AI model 1130 of the AI system 1100. The model structure 1120 defines the complexity of the pattern/relationship that the AI model 1130 expresses. Examples of structures that can be used as the model structure 1120 include decision trees, support vector machines, regression analyses, Bayesian networks, Gaussian processes, genetic algorithms, and neural networks. The model structure 1120 can include a number of structure layers, a number of nodes (or neurons) at each structure layer, and activation functions of each node. Each node's activation function defines how the node converts data received to data output. The structure layers may include an input layer of nodes that receive input data and an output layer of nodes that produce output data. The model structure 1120 may include one or more hidden layers of nodes between the input and output layers. The model structure 1120 can be a neural network that connects the nodes in the structured layers such that the nodes are interconnected. Examples of neural networks include a transformer (e.g., the transformer 1012, as described in relation to FIG. 10 above) or another neural network described above.

The model parameters 1122 represent the relationships learned during training and can be used to make predictions and decisions based on input data. The model parameters 1122 can weight and bias the nodes and connections of the model structure 1120. For instance, when the model structure 1120 is a neural network, the model parameters 1122 can weight and bias the nodes in each layer of the neural networks such that the weights determine the strength of the nodes and the biases determine the thresholds for the activation functions of each node. The model parameters 1122, in conjunction with the activation functions of the nodes, determine how input data is transformed into desired outputs. The model parameters 1122 can be determined and/or altered during training of the algorithm 1116.

The loss function engine 1124 can determine a loss function, which is a metric used to evaluate the AI model's 1130 performance during training. For instance, the loss function engine 1124 can measure the difference between a predicted output of the AI model 1130 and the actual output of the AI model 1130 and is used to guide optimization of the AI model 1130 during training to minimize the loss function. The loss function may be presented via the ML framework 1114 such that a user can determine whether to retrain or otherwise alter the algorithm 1116 if the loss function is over a threshold. In some instances, the algorithm 1116 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1126 adjusts the model parameters 1122 to minimize the loss function during training of the algorithm 1116. In other words, the optimizer 1126 uses the loss function generated by the loss function engine 1124 as a guide to determine what model parameters lead to the most accurate AI model 1130. Examples of optimizers include Gradient Descent (GD), Adaptive Gradient Algorithm (AdaGrad), Adaptive Moment Estimation (Adam), Root Mean Square Propagation (RMSprop), Radial Base Function (RBF), and Limited-memory BFGS (L-BFGS). The type of optimizer 1126 used may be determined based on the type of model structure 1120 and the size of data and the computing resources available in the data layer 1102.

The regularization engine 1128 executes regularization operations. Regularization is a technique that prevents over-fitting and underfitting of the AI model 1130. Overfitting occurs when the algorithm 1116 is overly complex and too adapted to the training data, which can result in poor performance of the AI model 1130. Underfitting occurs when the algorithm 1116 is unable to recognize even basic patterns from the training data such that it cannot perform well on training data or on validation data. The regularization engine 1128 can apply one or more regularization techniques to fit the algorithm 1116 to the training data properly, which helps constrain the resulting AI model 1130 and improves its ability for generalized application. Examples of regularization techniques include lasso (L1) regularization, ridge (L2) regularization, and elastic (L1 and L2) regularization.

The application layer 1108 describes how the AI system 1100 is used to solve problems or perform tasks. In an example implementation, the application layer 1108 can include the AI agent 114, the AI agent 214, and/or the AI agent 314 described, respectively, in FIGS. 1-3.

Computer System

Figure 12:
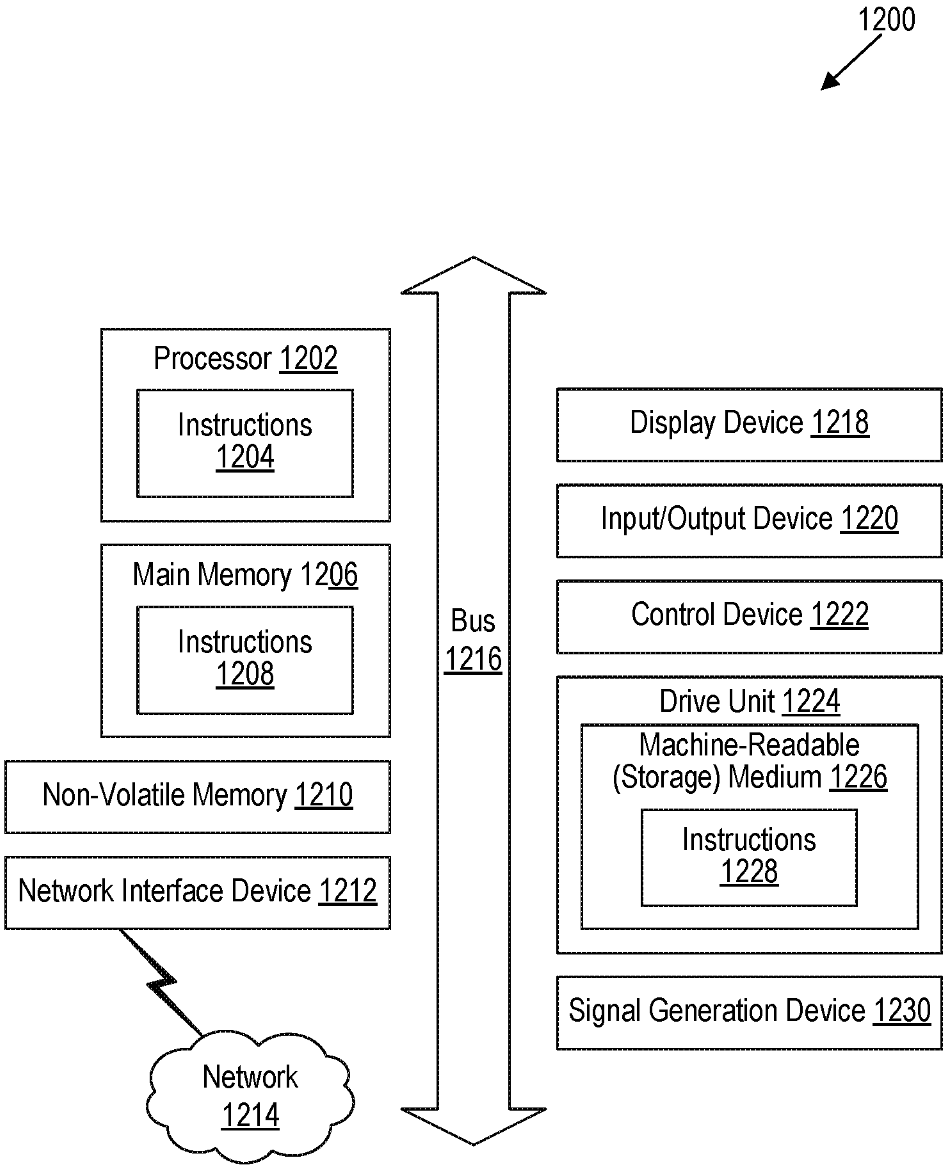
FIG. 12 is a block diagram that illustrates an example of a computer system in which at least some operations described herein can be implemented.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, a video display device 1218, an I/O device 1220, a control device 1222 (e.g., keyboard and pointing device), a drive unit 1224 that includes a machine-readable (storage) medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computer system 1200 can share a similar architecture as that of a server computer, personal computer (PC), tablet computer, mobile telephone, game console, music player, wearable electronic device, network-connected ("smart") device (e.g., a television or home assistant device), augmented reality (AR)/virtual reality (VR) systems (e.g., head-mounted display), or any electronic device capable of executing a set of instructions that specify action(s) to be taken by the computer system 1200. In some implementations, the computer system 1200 can be an embedded computer system, a system-on-chip (SOC), a single-board computer (SBC) system, or a distributed system such as a mesh of computer systems, or it can include one or more cloud components in one or more networks. Where appropriate, one or more computer systems 1200 can perform operations in real time, in near real time, or in batch mode.

The network interface device 1212 enables the computer system 1200 to mediate data in a network 1214 with an entity that is external to the computer system 1200 through any communication protocol supported by the computer system 1200 and the external entity. Examples of the network interface device 1212 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1206, non-volatile memory 1210, machine-readable (storage) medium 1226) can be local, remote, or distributed. Although shown as a single medium, the machine-readable (storage) medium 1226 can include multiple media (e.g., a centralized/distributed database and/or associated caches and servers) that store one or more sets of instructions 1228. The machine-readable (storage) medium 1226 can include any medium that is capable of storing, encoding, or carrying a set of instructions for execution by the computer system 1200. The machine-readable (storage) medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computer system 1200 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory, computer-readable storage medium comprising instructions recorded thereon, wherein the instructions when executed by at least one data processor of a system, cause the system to:

receive, by a communication session signal controller coupled to one or more autonomous artificial intelligence systems, an update signal associated with an entity, wherein the entity is associated with one or more available operations between the one or more autonomous artificial intelligence systems and the entity, wherein each autonomous artificial intelligence system corresponds to a respective computer-executable operation set configured to be autonomously executed by the respective autonomous artificial intelligence system on a respective software application set;

obtain, from an entity property repository, a primary entity property set associated with a primary entity;

filter, based at least in part on the primary entity property set, the one or more available operations to identify one or more potential operations with the entity, wherein the one or more potential operations are available to be performed by the one or more autonomous artificial intelligence systems;

generate, for each of the one or more potential operations, a respective policy-alignment output, wherein each policy-alignment output is generated based at least in part on the primary entity property set, an execution risk metric of the respective potential operation, and a respective policy ruleset, wherein each policy-alignment output characterizes a degree of alignment between a respective potential operation and the primary entity property set and a degree of adherence between the respective potential operation and the respective policy ruleset;

identify, based on the policy-alignment output, a selected operation of the one or more potential operations;

generate a multimodal communication artifact, wherein the multimodal communication artifact comprises a natural language description of (a) the update, (b) the selected operation, and (c) a degree of alignment between the selected operation and at least one primary entity property of the primary entity property set, wherein the multimodal communication artifact includes at least two of: text, audio data, image data, or video data;

transmit, by the communication session signal controller to an endpoint, the multimodal communication artifact, wherein transmitting the multimodal communication artifact causes an initiation of a communication session between the primary entity and the one or more autonomous artificial intelligence systems via the endpoint; and store, in an append-only data structure, a trace log comprising (a) an indication of the update signal, (b) an indication of the selected operation, and (c) a cryptographic commitment over at least a portion of the multimodal communication artifact.

2. The at least one non-transitory, computer-readable storage medium of claim 1, comprising instructions to:

receive, by the communication session signal controller via the endpoint and during the communication session, a response signal associated with the selected operation, wherein the response signal associated with the selected operation indicates a confirmation to cause performance of the selected operation; and cause performance, by the one or more autonomous artificial intelligence systems, of the selected operation.

3. The at least one non-transitory, computer-readable storage medium of claim 1, wherein the append-only data structure comprises a cryptographic ledger.

4. The at least one non-transitory, computer-readable storage medium of claim 1, wherein each policy-alignment output is generated by performing at least one of: comparing an execution risk metric of a respective potential operation to a risk metric threshold of the primary entity property set, or comparing a predicted result of the respective potential operation to an objective included in the primary entity property set.

5. The at least one non-transitory, computer-readable storage medium of claim 1, wherein the multimodal communication artifact comprises a natural language description of one or more of:

factors influencing an identification of the selected operation, the degree of alignment between the selected operation and the at least one primary entity property of the primary entity property set, a degree of alignment between the selected operation and at least one ruleset of a policy ruleset used to generate a suitability score for the selected operation, or factors influencing an execution risk metric used to generate the policy-alignment output for the selected operation.

6. The at least one non-transitory, computer-readable storage medium of claim 1, wherein the update corresponds to a first update, wherein the selected operation corresponds to a first selected operation, the storage medium comprising instructions to:

detect, by the one or more autonomous artificial intelligence systems, an occurrence of a second update;

identify a second selected operation of the one or more available operations between the one or more autonomous artificial intelligence systems and the entity;

determine, based at least in part on the second selected operation and a response signal associated with the first selected operation, that the one or more autonomous artificial intelligence systems will automatically cause performance of the second selected operation; and automatically cause, by the one or more autonomous artificial intelligence systems, the performance of the second selected operation.

7. The at least one non-transitory, computer-readable storage medium of claim 1, wherein e storage medium comprises instructions to:

receive, via the endpoint and during the communication session, a response signal associated with the selected operation, wherein the response signal comprises an indication of an additional operation of the one or more potential operations;

generate a policy-alignment output for the additional operation, wherein the policy-alignment output for the additional operation is generated based at least in part on the primary entity property set, an execution risk metric of the additional operation, and a policy ruleset, wherein each policy-alignment output characterizes a degree of alignment of the additional operation with the primary entity property set;

generate a subsequent communication artifact, wherein the subsequent communication artifact comprises a natural language description of a degree of alignment between the additional operation and at least one primary entity property of the primary entity property set;

transmit, to the endpoint and during the communication session, the subsequent communication artifact;

receive, via the endpoint and during the communication session, a confirmation to cause performance of the additional operation; and cause performance, by the one or more autonomous artificial intelligence systems, of the additional operation.

8. The at least one non-transitory, computer-readable storage medium of claim 1, wherein the selected operation comprises at least one of acquiring, selling, or rebalancing an ownership stake in the entity.

9. The at least one non-transitory, computer-readable storage medium of claim 1, wherein the primary entity property set comprises at least one of: a risk tolerance, a public entity preference, a liquidity profile, a time horizon, an objective, a legal status, or a jurisdiction.

10. A system comprising:

at least one hardware processor; and at least one non-transitory memory storing instructions, which, when executed by the at least one hardware processor, cause the system to:

obtain, by a communication session signal controller coupled to one or more artificial intelligence agents, data indicating an occurrence of an event associated with at least one entity, wherein the at least one entity is associated with one or more available operations between the one or more artificial intelligence agents and the at least one entity, wherein each artificial intelligence agent corresponds to a respective computer-executable operation set configured to be autonomously executed by the respective artificial intelligence agent on a respective software application set;

obtain, from an entity property repository, a primary entity property set associated with a primary entity;

determine, by the one or more artificial intelligence agents, one or more selected operations of the one or more available operations by:

filtering, based at least in part on the primary entity property set, the one or more available operations to identify one or more potential operations with the at least one entity, wherein the one or more potential operations are available to be performed by the one or more artificial intelligence agents on behalf of the primary entity, generating, for each of the one or more potential operations, a respective policy-alignment output, wherein each policy-alignment output is generated based at least in part on the primary entity property set, an execution risk metric of the respective potential operation, and a respective policy ruleset, wherein each policy-alignment output characterizes a degree of alignment between a respective potential operation and the primary entity property set and a degree of adherence between the respective potential operation and the respective policy ruleset, and identifying, based on the policy-alignment output, one or more selected operations of the one or more potential operations;

generate a communication artifact, wherein the communication artifact comprises a description of (a) the event, (b) the one or more selected operations, and (c) a degree of alignment between the one or more selected operations and at least one property of the primary entity property set, wherein the communication artifact includes at least two of: text, audio data, image data, or video data;

transmit, by the communication session signal controller to an endpoint, the communication artifact, wherein transmitting the communication artifact causes an initiation of a communication session between the primary entity and the one or more artificial intelligence agents via the endpoint; and store, in an append-only data structure, a trace log comprising (a) an indication of the event associated with the at least one entity, (b) an indication of the one or more selected operations, and (c) a cryptographic commitment over at least a portion of the communication artifact.

11. The system of claim 10, wherein the trace log further comprises one or more of: an identity of the primary entity, an indication of a risk assessment framework used to determine the one or more selected operations, an indication of the policy ruleset used to determine the one or more selected operations, a degree of alignment between the one or more selected operations and the policy ruleset, an identification of a data source used to detect the occurrence of the event associated with at least one entity, or an indication of an artificial intelligence agent of the one or more artificial intelligence agents.

12. The system of claim 10, wherein the append-only data structure is a cryptographic ledger.

13. The system of claim 10, wherein the communication artifact comprises a description of at least one of:

factors influencing an execution risk metric to identify the one or more selected operations, or an alignment between the one or more selected operations and at least one policy rule of a policy ruleset.

14. The system of claim 10, wherein instructions stored on the memory further cause the system to:

receive, from the endpoint and during the communication session, an indication of an additional operation with the at least one entity;

generate a subsequent communication artifact, wherein the subsequent communication artifact comprises a description of one or more of: a degree of alignment between the additional operation and at least one property of the primary entity property set, a degree of alignment between the additional operation and a policy ruleset, or an execution risk metric of the additional operation; and transmit, via the endpoint and during the communication session, the subsequent communication artifact.

15. The system of claim 10, wherein a selected operation of the one or more selected operations comprises at least one of acquiring, selling, or rebalancing an ownership stake in the at least one entity.

16. A computer-implemented method comprising:

receiving, by a communication session signal controller coupled to one or more artificial intelligence agents, an occurrence of an event associated with at least one entity, wherein the entity is associated with one or more available operations between the one or more artificial intelligence agents and the at least one entity, wherein each artificial intelligence agent corresponds to a respective computer-executable operation set configured to be autonomously executed by the respective artificial intelligence agent on a respective software application set;

obtaining, from an entity property repository, a primary entity property set associated with a primary entity;

determining, by the one or more artificial intelligence agents, a selected operation associated with the at least one entity by:

filtering, based at least in part on the primary entity property set, the one or more available operations to identify one or more potential operations with the at least one entity, wherein the one or more potential operations are available to be performed by the one or more artificial intelligence agents on behalf of the primary entity, generating, for each of the one or more potential operations, a respective policy-alignment output, wherein each policy-alignment output is generated based at least in part on the primary entity property set, an execution risk metric of the respective potential operation, and a respective policy ruleset, wherein each policy-alignment output characterizes a degree of alignment between a respective potential operation and the primary entity property set and a degree of adherence between the respective potential operation and the respective policy ruleset, and identifying, based on the policy-alignment output, a selected operation of the one or more potential operations;

generating a communication artifact, wherein the communication artifact comprises a description of (a) the event, (b) the selected operation, and (c) a degree of alignment between the selected operation and at least one property of the primary entity property set, wherein the communication artifact includes at least two of: text, audio data, image data, or video data;

transmitting, by the communication session signal controller to an endpoint, the communication artifact, wherein transmitting the communication artifact causes an initiation of a communication session between the primary entity and the one or more artificial intelligence agents via the endpoint;

generating a trace log entry, wherein the trace log entry comprises (a) an indication of the event associated with the at least one entity, (b) an indication of the selected operation, and (c) a cryptographic commitment over at least a portion of the communication artifact; and storing the trace log entry in an append-only data store.

17. The computer-implemented method of claim 16, wherein the trace log entry comprises one or more of:

factors influencing the execution risk metric, a natural language description of the degree of alignment between the selected operation and a policy ruleset associated with the selected operation, or a natural language description of the degree of alignment between the selected operation and the primary entity property set.

18. The computer-implemented method of claim 16, comprising:

receiving, from the endpoint and during the communication session, an indication of an approval of the selected operation;

generating a subsequent communication artifact, transmitting the subsequent communication artifact to an assisting entity;

receiving, from the assisting entity, a confirmation of the selected operation; and in response to receiving the confirmation, causing performance, by the one or more artificial intelligence agents, of the selected operation.

19. The computer-implemented method of claim 16, wherein append-only data structure is a cryptographic ledger.

* * * * *